(12) United States Patent
Dong et al.

(10) Patent No.: US 12,230,966 B2
(45) Date of Patent: Feb. 18, 2025

(54) POWER CONTROL METHOD AND APPARATUS, AND ENERGY SYSTEM

(71) Applicant: Huawei Digital Power Technologies Co., Ltd., Shenzhen (CN)

(72) Inventors: Mingxuan Dong, Shanghai (CN); Kai Xin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/476,577

(22) Filed: Sep. 28, 2023

(65) Prior Publication Data
US 2024/0030713 A1 Jan. 25, 2024

Related U.S. Application Data

(63) Continuation of application No. PCT/CN2021/083520, filed on Mar. 29, 2021.

(51) Int. Cl.
*H02J 3/32* (2006.01)
*H02J 3/38* (2006.01)
*H02J 7/00* (2006.01)

(52) U.S. Cl.
CPC .................. *H02J 3/32* (2013.01); *H02J 3/38* (2013.01); *H02J 7/0048* (2020.01); *H02J 2300/24* (2020.01); *H02J 2300/28* (2020.01)

(58) Field of Classification Search
CPC .... H02J 3/32; H02J 7/00; H02J 7/0048; H02J 3/38; H02J 2300/28; H02J 2300/24
See application file for complete search history.

(56) References Cited

U.S. PATENT DOCUMENTS

2019/0036482 A1 1/2019 Jin et al.

FOREIGN PATENT DOCUMENTS

| CN | 102664421 B | 9/2014 |
| CN | 104242330 A | 12/2014 |
| CN | 106849138 A | 6/2017 |
| CN | 105162147 B | 6/2018 |
| CN | 109494771 A | 3/2019 |
| CN | 109638857 A | 4/2019 |

*Primary Examiner* — Robert L Deberadinis
(74) *Attorney, Agent, or Firm* — SLATER MATSIL, LLP

(57) ABSTRACT

A method includes: performing one or more adjustments on a filter parameter based on battery information of the ESS that is at a first control moment, and performing one or more times of power filtering by the filter, until a power fluctuation rate determined based on a power obtained through filtering is less than or equal to a preset threshold; and determining, based on the power obtained through filtering, a given power of the ESS that is at the first control moment. During smooth control of a power, a relationship is established between battery information and a filter characteristic, so as to prevent a battery from quickly reaching a fully charged state or a fully discharged state.

20 Claims, 10 Drawing Sheets

POWER CONTROL METHOD AND APPARATUS, AND ENERGY SYSTEM

CROSS-REFERENCE TO RELATED APPLICATIONS

This application is a continuation of International Application No. PCT/CN2021/083520, filed on Mar. 29, 2021, the disclosure of which is hereby incorporated by reference in its entirety.

TECHNICAL FIELD

This application relates to the field of power grid control technologies, and more specifically, to a power control method and apparatus, and an energy system.

BACKGROUND

A penetration of renewable energy generation including wind power generation, photovoltaic power generation, and the like increases with the rapid development of the new energy industry. However, renewable energy is intermittent, fluctuating, and random due to limitations of natural resources, which causes great disturbance to a power grid and is not conducive to maintaining stability of the power grid. Therefore, an energy storage system (ESS) needs to be charged and discharged, to implement smooth control of an output power of the renewable energy and reduce the disturbance to the power grid.

However, during the smooth control of the power, the ESS tends to quickly reach a fully charged state or a fully discharged state. Consequently, a smooth service of the system stops.

SUMMARY

This application provides a power control method and apparatus, and an energy system, so as to prolong a service time of an ESS and improve reliability of a smooth service.

According to a first aspect, this application provides a power control method, applied to an energy system, where the energy system includes a power control apparatus, an ESS, and a renewable energy system, and the power control apparatus is connected to the ESS and the renewable energy system. The method includes: performing one or more adjustments on a filter parameter based on battery information of the ESS that is at a first control moment, and performing one or more times of power filtering by a filter based on a filter parameter obtained through each adjustment, until a power fluctuation rate determined based on a power obtained through filtering is less than or equal to a preset threshold, where a sampling power at the first control moment includes an active power of the ESS and an output power of the renewable energy system that are sampled at the first control moment; and each of the one or more times of power filtering is filtering performed based on a power obtained through a previous time of filtering; and determining, based on the power obtained through filtering, a given power of the ESS that is at the first control moment, where the given power of the ESS is used to control the active power of the ESS.

It should be understood that the battery information of the ESS at the first control moment may specifically include a state of charge (SOC), a charge-discharge balance degree, and a charge-discharge direction of the ESS at the first control moment. The performing one or more adjustments on a filter parameter based on battery information of the ESS that is at a first control moment may be specifically performing one or more adjustments on the filter parameter based on one or more of a state of charge, a charge-discharge balance degree, and a charge-discharge direction of the ESS at the first control moment.

It should be further understood that the given power of the ESS may be used to control the active power of the ESS that is at the first control moment, and may be further used to control an active power of the ESS that is at a next control moment of the first control moment, so that an active power sampled by the power control apparatus from the ESS that is at the next control moment is close to the given power. This is not limited in embodiments of this application.

Optionally, the filter is a finite impulse response (FIR) filter. The FIR filter may also be referred to as a non-recursive filter.

It should be understood that the FIR filter is merely an example of a filter, and should not constitute any limitation on this application. This application does not exclude a possibility of using another filter to implement a function that is the same as or similar to that of the FIR filter.

It should be further understood that a function of the filter may be implemented by using a computer software, for example, may be implemented by the power control apparatus executing corresponding code. Alternatively, the filter may be implemented by using a large-scale integrated digital hardware. This is not limited in embodiments of this application.

Based on the foregoing technical solution, in a power smooth control process, a relationship is established between battery information and a filter characteristic, so that filter parameters may be adjusted for different battery states, and power filtering may be performed based on filter parameters obtained through adjustment, so as to prevent a battery from quickly reaching a fully charged state or a fully discharged state. This prolongs time of a smooth service, improves reliability of the smooth service, and protects customer interests.

With reference to the first aspect, in some possible implementations of the first aspect, before the performing one or more adjustments on a filter parameter based on battery information of the ESS that is at a first control moment, the method further includes: determining that a power fluctuation rate calculated based on the sampling power that is at the first control moment is greater than the preset threshold.

Optionally, the preset threshold is 1%. It should be understood that for a specific case, for example, a renewable energy status or an actual circuit requirement, the preset threshold may be another value. This is not limited in this application.

Because filtering is performed on the sampling power at the first control moment only when it is determined that the fluctuation rate of the sampling power at the first control moment is greater than the preset threshold, filtering is not performed when the sampling power at the first control moment is less than or equal to the preset threshold, that is, filtering cost is increased when filtering is not required.

With reference to the first aspect, in some possible implementations of the first aspect, the power fluctuation rate indicates fluctuation amplitudes of powers sampled at a plurality of control moments in a window of the filter, an end position of the window is a latest control moment, and a length of the window is a quantity of control moments included in the window.

It should be understood that the window of the filter may be a sliding window whose end position is at a latest control moment. The window may advance forward as the control moment moves forward. The length of the window of the filter may be referred to as a window length for short, and the window length is a quantity of control moments included in the window. The adjustment of the filter parameter may include adjustment of the window length. Therefore, if the window length is adjusted at a current control moment, a quantity of control moments included in the window length may be an adjusted window length, that is, an adjustment value. If the window length is not adjusted at a current control moment, a quantity of control moments included in the window length may be a default value or an initial value. The initial value may be a predefined value, for example, may be a value set by a skilled person.

Optionally, the window length may be, for example, 1 minute, 30 minutes, or 1 hour. This is not limited in embodiments of this application.

Optionally, the power fluctuation rate δ satisfies:

$$\delta = \frac{P_{max} - P_{min}}{P_{Normal}} \times 100\%;$$

where $P_{max}$ represents a maximum power sampled in the window, $P_{min}$ represents a minimum power sampled in the window, and $P_{Normal}$ represents a rated power.

Optionally, the power fluctuation rate may satisfy:

$$\delta = \frac{P_{max} - P_{min}}{P_{max-\Delta P}} \times 100\%;$$

where, $P_{max}$ represents a maximum power sampled in the window, $P_{min}$ represents a minimum power sampled in the window, and $P_{max-\Delta P}$ represents a maximum power fluctuation rate in a time period (for example, one day).

It should be understood that calculation of the power fluctuation rate is not limited to the foregoing formula. A specific calculation formula of the power fluctuation rate is not limited in this application.

With reference to the first aspect, in some possible implementations of the first aspect, the determining, based on the power obtained through filtering, a given power of the ESS that is at the first control moment includes: determining a power change value, where the power change value is a difference between the power obtained through filtering and the sampling power at the first control moment; determining the given power of the ESS that is at the first control moment, where the given power of the ESS at the first control moment is a sum of a given power of the ESS at a second control moment and the power change value, and the second control moment is a previous control moment of the first control moment.

It should be understood that the power obtained through filtering may be a power that can enable a power fluctuation rate determined based on the power to be less than or equal to a preset threshold. The power does not need to be input to the filter for filtering at a current control moment (for example, the first control moment).

Each adjustment of the filter parameter may include adjustment of one or more of the following items: a cut-off frequency, a window length, and a filter weight.

With reference to the first aspect, in some possible implementations of the first aspect, the battery information of the ESS includes a charge-discharge balance degree of the ESS, the filter parameter includes a cut-off frequency; and the performing one or more adjustments on a filter parameter based on battery information of the ESS that is at the first control moment includes: performing T adjustments on the cut-off frequency based on the charge-discharge balance degree of the ESS that is at the first control moment, where a $t^{th}$ adjustment of the cut-off frequency satisfies: when the charge-discharge balance degree r(t) of the ESS satisfies $|r(t)|>1-D_B$, the cut-off frequency $\omega(t)=\omega_0+\|r(t)|-(1-D_B)\|\omega_B$; or when the charge-discharge balance degree r(t) of the ESS satisfies $|r(t)|>D_B$ and $|r(t)|\leq 1-D_B$, the cut-off frequency $\omega(t)=\omega_0$; or when the charge-discharge balance degree r(t) of the ESS satisfies $|r(t)|\leq D_B$, the cut-off frequency $\omega(t)=\omega_0-\|r(t)|-D_B|\omega_B$, where $0\leq t\leq T-1$, $T\geq 1$, and both t and T are integers; $D_B$ is a predefined frequency value; $\omega_B$ represents a maximum adjustment range of the cut-off frequency; and $\omega_0$ represents a rated cut-off frequency.

It should be understood that a cut-off frequency of the filter affects a filtering effect. A larger cut-off frequency indicates a weaker filtering effect and a smaller output of the ESS. A smaller cut-off frequency indicates a weaker filtering effect and a larger output of the ESS.

It should be further understood that, when the charge-discharge balance degree r(t) of the ESS satisfies $|r(t)|>1-D_B$, the cut-off frequency $\omega(t)=\omega_0+\|r(t)|-(1-D_B)|\omega_B$, that is, the cut-off frequency is increased, and the filtering effect is weakened, so that an output active power (corresponding to a discharging situation) or an input active power (corresponding to a charging situation) of the ESS can be reduced; and when the charge-discharge balance degree r(t) of the ESS satisfies $|r(t)|\leq D_B$, the cut-off frequency $\omega(t)=\omega_0-\|r(t)|-D_B|\omega_B$, that is, the cut-off frequency is decreased, and the filtering effect is enhanced, so that the output active power or the input active power of the ESS can be increased. When the charge-discharge balance degree r(t) of the ESS satisfies $|r(t)|>D_B$ and $|r(t)|1-D_B$, the cut-off frequency $\omega(t)=\omega_0$, that is, the cut-off frequency remains unchanged, and the filtering effect remains unchanged. The output active power or the input active power of the ESS may remain the same as that of the last control moment.

The charge-discharge balance degree is considered in the adjustment of the cut-off frequency, so as to prevent a battery from quickly reaching a fully charged state or a fully discharged state when a battery capability is insufficient. This prolongs time of a smooth service, improves reliability of the smooth service, and protects customer interests.

With reference to the first aspect, in some possible implementations of the first aspect, the battery information of the ESS includes a charge-discharge balance degree of the ESS, the filter parameter includes a window length, and the window length is a quantity of control moments included in a window of the filter; and the performing one or more adjustments on a filter parameter based on the battery information of the ESS that is at the first control moment includes: performing S adjustments on the window length based on the charge-discharge balance degree of the ESS that is at the first control moment, where the window length N(s) obtained through the $s^{th}$ adjustment satisfies:

$$N(s) = [2(r_0+1)^2 - (r(s)+r_0)^2]\frac{N_0}{(r_0+1)^2}\frac{\delta_{s-1}}{\delta_{th}},$$

where $0\leq s\leq S-1$, $S\geq 1$, both s and S are integers, $r_0$ represents a target value of the charge-discharge balance degree, $N_0$ represents a default value of the window length, $\delta_{th}$ represents the preset threshold, and $\delta_{s-1}$ represents a power fluctuation rate determined based on a power obtained through an $(s-1)^{th}$ filtering.

It should be understood that, according to a filter characteristic, a larger window length indicates a narrower transition band, a larger stop-band attenuation slope, and a smoother filtering.

It should be further understood that, the window length is adjusted based on the battery information, so that when the battery charge-discharge balance degree is at a target value of the charge-discharge balance degree, the window length of the filter is maximum, representing that a filtering effect is enhanced, thereby increasing the output active power of the ESS; and when the battery level is close to fully charged or fully discharged, the window length of the filter is minimum, representing that the filtering effect is weakened, thereby reducing the output active power of the ESS.

With reference to the first aspect, in some possible implementations of the first aspect, the battery information of the ESS includes a charge-discharge balance degree and a charge-discharge direction that are of the ESS, and the filter parameter includes a filter weight; and the performing one or more adjustments on a filter parameter based on the battery information of the ESS that is at the first control moment includes: adjusting the filter weight based on the charge-discharge balance degree and the charge-discharge direction that are of the ESS that is at the first control moment, where when the charge-discharge balance degree of the ESS satisfies $r>1-D_B$ at the first control moment and the ESS is in a charging state, or $r\leq D_B-1$ and when the ESS is in a discharging state, the filter weight $\gamma$ satisfies: $\gamma=1-|r|$; or when the charge-discharge balance degree of the ESS satisfies $r>1-D_B$ at the first control moment and the ESS is in a discharging state, or $r\leq D_B-1$ and when the ESS is in a charging state, the filter weight $\gamma$ satisfies: $\gamma=1+|r|$; or when the charge-discharge balance degree of the ESS satisfies $|r|\leq 1-D_B$ at the first control moment, the filter weight $\gamma$ satisfies: $\gamma=1$.

It is assumed that the first control moment is an $(N-1)^{th}$ control moment in the N control moments, $P_{ESS}(N-1)$ may represent an active power of the ESS at the first control moment, and $P^*_{ESS}(N-2)$ may represent a given power of the ESS that is at the last control moment (for example, the second control moment) of the first control moment.

Optionally, $P_{ESS}(N-1)>0$ or $P^*_{ESS}(N-2)>0$ may represent that the ESS is in a discharging state, and $P_{ESS}(N-1)<0$ or $P^*_{ESS}(N-2)<0$ may represent that the ESS is in a charging state.

It should be understood that, based on the charge-discharge balance degree and the charging/discharging state of the battery, filter weights of sampling powers of a battery with a strong charging capability, that is, $r\leq D_B-1$ and the battery is in a charging state, and a battery with a strong discharging capability, that is, $r>1-D_B$ and the battery is in a discharging state are increased, and filter weights of sampling powers of a battery with a strong discharging capability and the battery is in a charging state, and a battery with a strong charging capability and the battery is in a discharging state are reduced, so as to prevent the batteries from quickly reaching a fully charged state or a fully discharged state. This prolongs time of a smooth service, improves reliability of the smooth service, and protects customer interests.

With reference to the first aspect, in some possible implementations of the first aspect, the method further includes: determining an adjustment coefficient of the filter weight, where the adjustment coefficient satisfies: $\chi_n=\beta_n\alpha_n$, where $\chi_n$ represents an adjustment coefficient corresponding to an $n^{th}$ control moment in the N control moments included in a window of the filter, $\beta_n$ represents a first adjustment value corresponding to the $n^{th}$ control moment, and $\beta_n$ satisfies:

$$\beta_n = 1 - k + \frac{kn}{N},$$

where N represents a window length of the filter, $0\leq n\leq N-1$, $N\geq 1$, both n and N are integers; k is a coefficient of a window function weight of the filter; $\alpha_n$ represents a second adjustment value corresponding to the $n^{th}$ control moment, and $\alpha_n$ satisfies: when $|P_n-P_{n-1}|\leq \eta P_n$, $\alpha_n=1$; or when $P_n-P_{n-1}>\eta P_n$, $$\alpha_n = \frac{P_{n-1}}{P_n};$$

or when $P_n-P_{n-1}<\eta P_n$, $$\alpha_n = \frac{P_n}{P_{n-1}},$$

where $\eta$ is a predefined value, and $0<\eta<1$; $P_n$ represents a sampling power at the $n^{th}$ control moment; and $P_{n-1}$ represents a sampling power at an $(n-1)^{th}$ control moment.

It should be understood that, by introducing the first adjustment value and adjusting the filter weight, the weight of a recent power sequence may be increased, and the weight of a long-term power sequence may be decreased, so that a filtering result is more biased towards a real power direction.

It should be further understood that, if a sampling power suddenly changes at a specific control moment, a power fluctuation rate is large. If only filtering is required, a closed-loop iteration may be required for a plurality of times to obtain an ideal filtering result after the filtering effect is enhanced. By introducing the second adjustment value and adjusting the filter weight, when the sampling power at the first control moment suddenly changes, the weight of the sampling power at the first control moment is reduced, so that a filtering process is accelerated, the power fluctuation rate is less than or equal to the preset threshold as soon as possible, the filtering effect is achieved, and the times of closed-loop iterations are reduced.

With reference to the first aspect, in some possible implementations of the first aspect, if the first control moment is the $(N-1)^{th}$ control moment of the N control moments, a given power $P^*_{ESS}(N-1)$ of the ESS at the $(N-1)^{th}$ control moment determined based on the power obtained through filtering satisfies:

$$P^*_{ESS}(N-1) = \frac{\sum_{n=0}^{N-1} \alpha_n \beta_n P_n}{\sum_{n=0}^{N-1} \alpha_n \beta_n} \gamma(n)$$

where the power obtained through filtering is obtained by filtering, based on a filter parameter obtained through adjustment, a sampling power that is at an $(N-1)^{th}$ control moment, and $P_n$ represents the sampling power at the $n^{th}$ control moment.

It should be understood that, because the battery information is considered in a power smooth control process, a relationship is established between the battery information and a filter characteristic. When a battery capability is insufficient, the filter parameter is adjusted with reference to the battery information, and a cut-off frequency, a window length, a filter weight, and the like are adjusted for different battery states, so as to prevent a battery from quickly reaching a fully charged state or a fully discharged state. This prolongs time of a smooth service, improves reliability of the smooth service, and protects customer interests.

With reference to the first aspect, in some possible implementations of the first aspect, the charge-discharge balance degree r:

$$r = \frac{SOC_c - \frac{SOC_{max} - SOC_{min}}{2}}{\frac{SOC_{max} - SOC_{min}}{2}}$$

of the ESS that is at the first control moment is determined, based on the SOC of the ESS at the first control moment and the following formula, where $SOC_{max}$ represents a maximum value of the SOC of the ESS, $SOC_{min}$ represents a minimum value of the SOC of the ESS, and $SOC_c$ represents the state of charge of the ESS at the first control moment.

The $SOC_c$ may be a state of charge of the ESS that is collected at the first control moment, or may be a state of charge of the ESS that is collected last time before the first control moment arrives. This is not limited in embodiments of this application.

It may be understood that the charge-discharge balance degree $r_n$ of the ESS at the $n^{th}$ control moment may satisfy:

$$r_n = \frac{SOC_n - \frac{SOC_{max} - SOC_{min}}{2}}{\frac{SOC_{max} - SOC_{min}}{2}},$$

where $SOC_n$ may represent a state of charge of the ESS at the $n^{th}$ control moment.

It should be understood that the SOC of the ESS at the $n^{th}$ control moment may be an SOC collected at the $n^{th}$ control moment, or may be an SOC collected from the ESS last time before the $n^{th}$ control moment arrives. This is not limited in embodiments of this application. Correspondingly, a charge-discharge balance degree of the ESS at the $n^{th}$ control moment may be calculated based on an SOC collected at the $n^{th}$ control moment, or may be calculated before the $n^{th}$ control moment based on a latest collected SOC. This is not limited in embodiments of this application either. In other words, the window of the filter includes N control moments, which does not mean that the SOC of the ESS is collected for N times, and does not mean that the charge-discharge balance degree is calculated for N times.

With reference to the first aspect, in some possible implementations of the first aspect, the method further includes: determining that a power fluctuation rate calculated based on the sampling power that is at the first control moment is less than or equal to the preset threshold; and determining, based on the sampling power at the first control moment, a given power of the ESS that is at the first control moment.

It should be understood that, when the power fluctuation rate is less than the preset threshold, a specific method for determining the given power of the ESS that is at the first control moment may be the same as that in the prior art. For brevity, details are not described herein again.

According to a second aspect, this application provides a power control apparatus, connected to an ESS and a renewable energy system. The power control apparatus includes a processor and a driving unit, where the processor performs one or more adjustments on a filter parameter based on battery information of the ESS that is at a first control moment, and performs one or more times of power filtering by the filter based on the filter parameter obtained through each adjustment, until a power fluctuation rate determined based on a power obtained through filtering is less than or equal to a preset threshold, where each of the one or more times of power filtering is filtering performed based on a power obtained through a previous time of filtering, and a sampling power at the first control moment includes an active power of the ESS and an output power of the renewable energy system that are sampled at the first control moment; and a given power of the ESS at the first control moment is determined based on the power obtained through filtering, where the given power of the ESS is used to control the active power of the ESS.

Based on the foregoing technical content, considering in a power smooth control process, a relationship is established between battery information and a filter characteristic. When a battery capability is insufficient, a filter parameter is adjusted with reference to the battery information, and a cut-off frequency, a window length, a filter weight, and the like are adjusted for different battery states, so as to prevent a battery from quickly reaching a fully charged state or a fully discharged state. This prolongs time of a smooth service, improves reliability of the smooth service, and protects customer interests.

With reference to the second aspect, in some possible implementations of the second aspect, the processor is further configured to determine that a power fluctuation rate calculated based on the sampling power that is at the first control moment is greater than the preset threshold.

With reference to the second aspect, in some possible implementations of the second aspect, the power fluctuation rate indicates fluctuation amplitudes of powers sampled at a plurality of control moments in a window of the filter, an end position of the window is a latest control moment, and a quantity of control moments included in the window length is a default value or an adjustment value.

With reference to the second aspect, in some possible implementations of the second aspect, the processor is specifically configured to: determine a power change value, where the power change value is a difference between a sampling power at the first control moment and the power obtained through filtering; and determine a given power of the ESS that is at the first control moment, where the given power of the ESS at the first control moment is a sum of the given power of the ESS at a second control moment and the power change value, and the second control moment is a previous control moment of the first control moment.

With reference to the second aspect, in some possible implementations of the second aspect, battery information of the ESS includes a charge-discharge balance degree of the ESS, the filter parameter includes a cut-off frequency; and the processor is specifically configured to perform T adjustments on the cut-off frequency based on the charge-discharge balance degree of the ESS that is at the first control moment, where a $t^{th}$ adjustment of the cut-off frequency satisfies: when the charge-discharge balance degree r(t) of the ESS satisfies $|r(t)|>1-D_B$, the cut-off frequency $\omega(t) = \omega_0 + ||r(t)|-(1-D_B)|\omega_B$; or, when the charge-discharge balance degree r(t) of the ESS satisfies $|r(t)|>D_B$ and $|r(t)|\leq 1-D_B$, the cut-off frequency $\omega(t)=\omega_0$; or when the charge-discharge balance degree r(t) of the ESS satisfies $|r(t)|\leq D_B$, the cut-off frequency $\omega(t)=\omega_0-\||r(t)|-D_B|\omega_B$, where $0\leq t\leq T-1$, $T\geq 1$, and both t and T are integers; $D_B$ is a predefined frequency value; $\omega_B$ represents a maximum adjustment range of the cut-off frequency; and $\omega_0$ represents a rated cut-off frequency.

With reference to the second aspect, in some possible implementations of the second aspect, the battery information of the ESS includes the charge-discharge balance degree of the ESS, the filter parameter includes the window length; and the processor is specifically configured to: perform S adjustments on the window length based on the charge-discharge balance degree of the ESS that is at the first control moment, where a window length N(s) after an $s^{th}$ adjustment satisfies:

$$N(s) = \left[2(r_0+1)^2 - (r(s)+r_0)^2\right]\frac{N_0}{(r_0+1)^2}\frac{\delta_{s-1}}{\delta_{th}},$$

where $0\leq s\leq S-1$, $S\geq 1$, and both s and S are integers; and $r_0$ represents a target value of the charge-discharge balance degree, $N_0$ represents a default value of the window length, $\delta_{th}$ represents the preset threshold, and $\delta_{s-1}$ represents a power fluctuation rate determined based on a power obtained through an $(s-1)^{th}$ time of filtering.

With reference to the second aspect, in some possible implementations of the second aspect, the battery information of the ESS includes a charge-discharge balance degree and a charge-discharge direction that are of the ESS, and the filter parameter includes a filter weight; and the processor is specifically configured to adjust the filter weight based on the charge-discharge balance degree and the charge-discharge direction that are of the ESS that is at the first control moment, where when the charge-discharge balance degree of the ESS satisfies $r>1-D_B$ at the first control moment and the ESS is in a charging state, or $r\leq D_B-1$ and the ESS is in a discharging state, the filter weight $\gamma$ satisfies: $\gamma=1-|r|$; or when the charge-discharge balance degree of the ESS satisfies $r>1-D_B$ at the first control moment and the ESS is in a discharging state, or $r\leq D_B-1$ and the ESS is in a charging state, the filter weight $\gamma$ satisfies: $\gamma=1+|r|$; or when the charge-discharge balance degree of the ESS satisfies $|r|\leq 1-D_B$ at the first control moment, the filter weight $\gamma$ satisfies: $\gamma=1$.

With reference to the second aspect, in some possible implementations of the second aspect, the processor is further configured to determine an adjustment coefficient of the filter weight, where the adjustment coefficient satisfies: $\chi_n=\beta_n\alpha_n$, where $\chi_n$ represents an adjustment coefficient corresponding to an $n^{th}$ control moment in N control moments included in a window of the filter, $\beta_n$ represents a first adjustment value corresponding to the $n^{th}$ control moment, and $\beta_n$ satisfies:

$$\beta_n = 1 - k + \frac{kn}{N},$$

where N represents a window length of the filter, $0\leq n\leq N-1$, $N\geq 1$, both n and N are integers; k is a coefficient of a window function weight of the filter; $\alpha_n$ represents a second adjustment value corresponding to the $n^{th}$ control moment, and $\alpha_n$ satisfies: when $|P_n-P_{n-1}|\leq \eta P_n$, $\alpha_n=1$; or when $P_n-P_{n-1}>\eta P_n$, $$\alpha_n = \frac{P_{n-1}}{P_n};$$

or when $P_n-P_{n-1}<\eta P_n$, $$\alpha_n = \frac{P_n}{P_{n-1}},$$

where $\eta$ is a predefined value, and $0<\eta<1$; $P_n$ represents a sampling power at the $n^{th}$ control moment; and $P_{n-1}$ represents a sampling power at an $(n-1)^{th}$ control moment.

With reference to the second aspect, in some possible implementations of the second aspect, if the first control moment is an $(N-1)^{th}$ control moment in the N control moments, a given power $P^*_{ESS}(N-1)$ of the ESS at the $(N-1)^{th}$ control moment determined based on the power obtained through filtering satisfies:

$$P^*_{ESS}(N-1) = \frac{\sum_{n=0}^{N-1}\alpha_n\beta_n P_n}{\sum_{n=0}^{N-1}\alpha_n\beta_n}\gamma(n),$$

where the power obtained through filtering is obtained by filtering, based on a filter parameter obtained through adjustment, a sampling power that is at the $(N-1)^{th}$ control moment, and $P_n$ represents a sampling power at the $n^{th}$ control moment.

With reference to the second aspect, in some possible implementations of the second aspect, the battery information further includes the state of charge of the ESS, and the processor is further configured to: determine a charge-discharge balance degree r:

$$r = \frac{SOC_c - \frac{SOC_{max} - SOC_{min}}{2}}{\frac{SOC_{max} - SOC_{min}}{2}}$$

of the ESS that is at the first control moment, based on the SOC of the ESS at the first control moment and the following formula, where $SOC_{max}$ represents a maximum value of the SOC of the ESS, $SOC_{min}$ represents a minimum value of the SOC of the ESS, and $SOC_c$ represents the state of charge of the ESS at the first control moment; N represents a quantity of control moments included in the window of the filter, $0\leq n\leq N-1$, $N\geq 1$, and both n and N are integers.

The $SOC_c$ may be a state of charge of the ESS that is collected at the first control moment, or may be a state of charge of the ESS that is collected last time before the first control moment arrives. This is not limited in embodiments of this application.

It may be understood that the charge-discharge balance degree $r_n$ of the ESS at the $n^{th}$ control moment may satisfy:

$$r_n = \frac{SOC_n - \frac{SOC_{max} - SOC_{min}}{2}}{\frac{SOC_{max} - SOC_{min}}{2}},$$

where $SOC_n$ may represent a state of charge of the ESS at the $n^{th}$ control moment.

With reference to the second aspect, in some possible implementations of the second aspect, the processor is further configured to: determine that a power fluctuation rate calculated based on the sampling power that is at the first control moment is less than or equal to the preset threshold; and determine, based on the sampling power at the first control moment, a given power of the ESS that is at the first control moment.

According to a third aspect, this application provides a processing apparatus. The apparatus includes a unit or a module configured to implement the method according to the foregoing first aspect and any one of possible implementations of the first aspect. It should be understood that the modules or units may implement corresponding functions by executing a computer program.

According to a fourth aspect, a computer program product is provided. The computer program product includes a computer program (which may also be referred to as code or an instruction). When the computer program is run, a computer is enabled to perform the method according to the foregoing first aspect and any one of possible implementations of the first aspect.

According to a fifth aspect, a computer readable storage medium is provided, where the computer readable storage medium stores a computer program (which may also be referred to as code or an instruction). When the computer program is run, the computer is enabled to perform the method according to the foregoing first aspect and any one of possible implementations of the first aspect.

According to a sixth aspect, an energy system is provided, including: an ESS, a renewable energy system, and a power control apparatus, where the power control apparatus is connected to the ESS and the renewable energy system, where the power control apparatus is configured to: perform one or more adjustments on a filter parameter based on battery information of the ESS that is at a first control moment; perform one or more times of power filtering by a filter based on the filter parameter obtained through each adjustment, until a power fluctuation rate determined based on a power obtained through filtering is less than or equal to a preset threshold, where each of the one or more times of power filtering is filtering performed based on a power obtained through a previous time of filtering, a sampling power at the first control moment includes an active power of the ESS and an output power of the renewable energy system that are sampled at the first control moment; determine, based on the power obtained through filtering, a given power of the ESS that is at the first control moment; and control the active power of the ESS based on the given power of the ESS that is at the first control moment.

It should be understood that the power control apparatus may be the power control apparatus in the foregoing second aspect and any one of possible implementations of the second aspect. For related descriptions of the power control apparatus, refer to the foregoing related descriptions. For brevity, details are not described herein again.

It should be further understood that, the technical solutions in the second aspect to the sixth aspect of this application correspond to the technical solutions in the first aspect of this application, and beneficial effects achieved by the aspects and corresponding feasible implementations are similar. For brevity, details are not described herein again.

DETAILED DESCRIPTION OF ILLUSTRATIVE EMBODIMENTS

The following describes technical solutions of this application with reference to accompanying drawings.

The method according to this application may be applied to a renewable energy generator set including a wind power generator set, a hydropower generator set, a solar power generator set, a geothermal energy generator set, a tidal energy generator set, a wave energy generator set, and a marine temperature difference energy generator set.

The renewable energy system in embodiments of this application may be, for example, a plurality of power supply systems such as a wind power system, a hydropower system, and a photovoltaic (PV) system, and the like.

Because renewable energy is affected by natural resources, its output power itself is fluctuating. To reduce the interference to a power grid and improve a ramp-up characteristic, the output power of the renewable energy needs to be suppressed based on the ESS to achieve an effect of power smooth control.

For ease of understanding embodiments of this application, a system architecture applicable to the power control method according to embodiments of this application is first described in detail with reference to FIG. 1 and FIG. 2.

Figure 1:
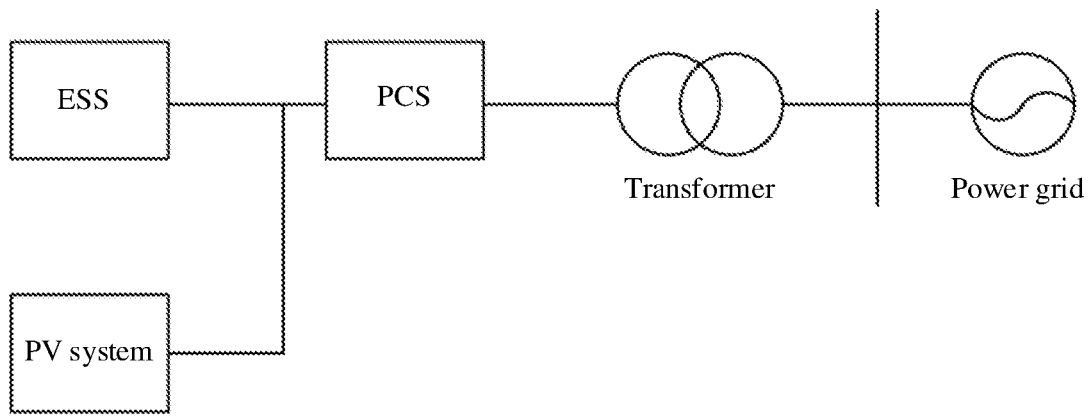
FIG. 1 is a system architecture in a direct current coupling scheme based on a PV system according to an embodiment of this application.

FIG. 1 shows a system architecture in a direct current coupling scheme based on a PV system. As shown in FIG. 1, the system architecture includes an energy storage system (ESS), a PV system, a power conversion system (PCS), a transformer, and a power grid. The PV system may be configured to output a photovoltaic generation power, and the PCS may be configured to control an input or output power of the ESS, so as to implement smooth control of the PV system generation power. For example, the PCS may be configured to: control the ESS to charge, to suppress a relatively large power output by the PV system, when the power output by the PV system is relatively large and a power fluctuation is relatively large; or may be configured to: control the ESS to discharge, to suppress a relatively small power output by the PV system, when the power output by the PV system is relatively small and a power fluctuation is relatively large.

Figure 2:
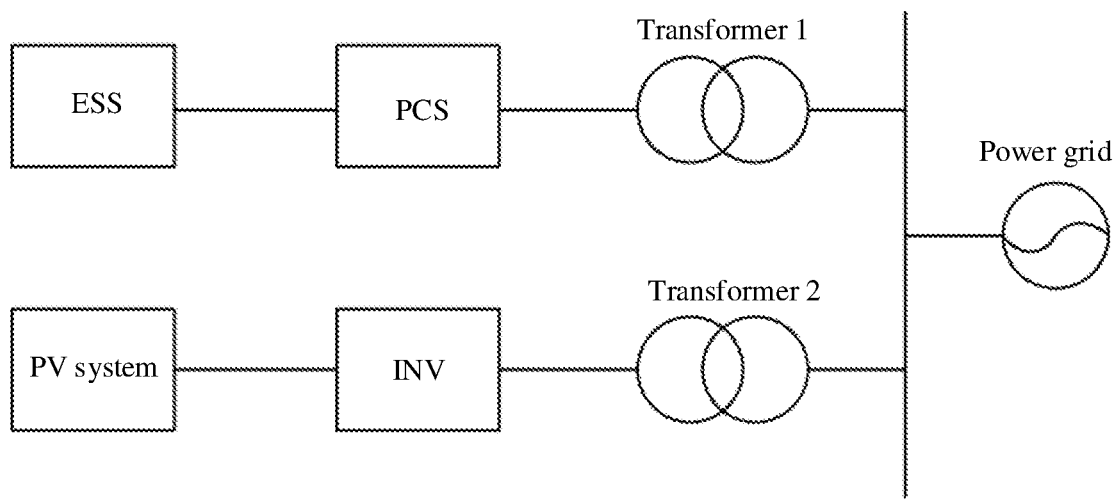
FIG. 2 is a system architecture in an alternating current coupling scheme based on a PV system according to an embodiment of this application.

FIG. 2 is a system architecture in an alternating current coupling scheme based on a PV system. As shown in FIG. 2, the system architecture includes: an ESS, a PV system, a PCS, an inverter (INV), a transformer 1, a transformer 2, and a power grid. The inverter is configured to convert a direct current into an alternating current. Functions of other components are described in detail above with reference to FIG. 1. For brevity, details are not described herein again.

It should be understood that a PV system and a PCS are used as examples herein to show an example of a system architecture applicable to the power control method according to this application. However, this should not constitute any limitation on this application. For example, the PV system in FIG. 1 and FIG. 2 may be replaced with a wind power generation system or a hydropower generation system. The PCS in FIG. 1 and FIG. 2 may also be replaced with an apparatus that can implement a power control method, such as a direct current (DC)-DC converter (DC-DC converter). This is not limited in this application.

It can be known from the foregoing description with reference to FIG. 1 and FIG. 2 that, when the ESS is fully charged or fully discharged, a power suppression effect on the PV system cannot be implemented, which leads to stop a system smooth service. This may cause a great loss to the customer.

To resolve the foregoing problem, embodiments of this application provide a power control method. Battery information is considered in a power smooth control process, and a filter parameter is adjusted with reference to the battery information, so as to prolong time of a smooth service, improve reliability of the smooth service, and protect customer interests.

To facilitate understanding of embodiments of this application, the following first briefly describes terms used in this specification.

1. Battery information: the battery information in embodiments of this application may be specifically battery information of the ESS. The battery information of the ESS may specifically include a state of charge, a charge-discharge balance degree, and a charge-discharge direction of the ESS.

2. A state of charge (SOC): may be used to represent a percentage of remaining power in a battery. A value range of the SOC may be 0% to 100%. When SOC=0%, it may represent that the battery is fully discharged; and when SOC=100%, it may represent that the battery is fully charged.

3. A charge-discharge balance degree: may be used to represent battery level information. For any control moment n, the charge-discharge balance degree may be obtained through calculation according to the SOC.

The charge and discharge balance degree may satisfy:

$$r_n = \frac{SOC_n - \frac{SOC_{max} - SOC_{min}}{2}}{\frac{SOC_{max} - SOC_{min}}{2}};$$

where $SOC_n$ represents the SOC of the ESS collected at the $n^{th}$ control moment; $SOC_{max}$ represents a maximum value of the SOC of the ESS, and a value of the maximum value is usually 100%; and $SOC_{min}$ represents a minimum value of the SOC of the ESS, and a value of the minimum value is usually 0%.

4. A power fluctuation rate: may be used to measure a magnitude of power fluctuation, for example, may be a percentage of a magnitude of power fluctuation in a rated power in a preset time period.

In embodiments of this application, the preset time period may be a sliding window that uses a control moment as a node and uses preset duration as a magnitude/size. The reason why the preset time period is referred to as a sliding window is that as the control moment moves forward, the preset time period also moves forward, which is similar to a window that slides as time moves forward.

The preset duration may be, for example, 1 minute, 30 minutes, or 1 hour. This is not limited in embodiments of this application.

Optionally, the power fluctuation rate δ may satisfy:

$$\delta = \frac{P_{max} - P_{min}}{P_{Normal}} \times 100\%;$$

where $P_{max}$ represents the maximum power sampled in the window, $P_{min}$ represents the minimum power sampled in the window, and $P_{Normal}$ represents the rated power.

Optionally, the power fluctuation rate may satisfy:

$$\delta = \frac{P_{max} - P_{min}}{P_{max-\Delta P}} \times 100\%;$$

where $P_{max}$ represents the maximum power sampled in the window, $P_{min}$ represents the minimum power sampled in the window, and $P_{max-\Delta P}$ represents the maximum power fluctuation in a specific time period (for example, one day).

It should be understood that calculation of the power fluctuation rate is not limited to the foregoing formula. A specific calculation formula of the power fluctuation rate is not limited in this application.

5. Filter parameters: used to adjust the filtering performance. A filter in embodiments of this application is an FIR filter, or is referred to as a non-recursive filter. Filter parameters in embodiments of this application may include a cut-off frequency, a window length, a filter weight, and the like.

6. A cut-off frequency: means a frequency point on the right of the passband of a low-pass filter and a frequency point on the left of the passband of a high-pass filter. The cut-off frequency of the filter affects the filtering effect. A larger cut-off frequency indicates a weaker filtering effect and a smaller PCS output. A smaller cut-off frequency indicates a stronger filtering effect and a larger PCS output.

7. A window length: A unit impulse of a window function filter responds to the window length. According to the characteristics of the FIR filter, the larger the window length, the narrower a transition band, the larger the stopband attenuation slope, and the smoother after filtering.

The window length may be specifically represented by a quantity of control times or a quantity of control moments. For example, if the window of the filter includes N control moments, it represents that the window length is N. The window may be a sliding window that uses a latest control moment as an end position and uses N control moments as a length, and may advance forward as time moves forward.

8. A sampling power: may also be referred to as a feedback power or an actual power.

9. A given power: may also be referred to as a reference power or a target power. When the sampling power needs to be adjusted, the sampling power may be adjusted by changing the given power, so that the power output to the power grid is smoother.

10. A driving unit: applied in a power system and is a dedicated wire connecting the power generation system and the power grid. It can transmit the electric energy generated by the power generation system to the power grid and transmit the electric energy from the power grid to a power plant or system again. Therefore, it is also referred to as a contact line. A possible form of the driving unit is a driving circuit.

In embodiments of this application, the driving unit may control the active power of the ESS based on a value of the given power obtained through calculation, so that the active power of the ESS is close to the given power.

To facilitate understanding of embodiments of this application, the following descriptions are provided.

First, for ease of understanding and description, main parameters used in this application are described as follows:

N is the window length of the FIR filter, that is, a quantity of control moments included in the window of the FIR filter, or a quantity of control times. N≥1 and is an integer.

n: 0≤n≤N−1, and n is an integer.

δ: the power fluctuation rate.

r: the charge-discharge balance degree.

P: the sampling power.

$P_{ESS}$: the active power of the ESS.

$P^*_{ESS}$: the given power of the ESS.

$P_{PV}$: an output power of a photovoltaic system.

ω: the cut-off frequency.

Second, for ease of understanding and description, this specification describes embodiments of this application by using a PV system as an example of a renewable energy system in the accompanying drawings and embodiments. However, this should not constitute any limitation on embodiments of this application. PV in this document may also be replaced with wind power generation, hydropower generation, and the like.

Third, numbers such as "first" and "second" are merely used for differentiation for ease of description, and are not intended to limit the scope of embodiments of this application. For example, numbers such as "first" and "second" may be used to differentiate between different control moments.

Fourth, in embodiments of this application, for ease of description, when numbering is involved, numbers may be consecutive and start from 0. For example, the N control moments may include a $0^{th}$ control moment to the $(N-1)^{th}$ control moment. By analogy, examples are not described one by one herein. Certainly, specific implementation is not limited thereto. For example, numbers may alternatively be consecutive and start from 1. It should be understood that the foregoing descriptions are all provided to help describe the technical solutions according to embodiments of this application, but are not intended to limit the scope of this application.

Fifth, descriptions such as "when/in the case of . . . ", "when", and "if" all mean that a device (for example, a processor or a driving unit) performs corresponding processing in an objective situation, and do not limit a time, and do not require that the device (for example, a processor or a driving unit) perform a determining action during implementation, and do not mean that there is another limitation either.

Sixth, embodiments of this application relate to mathematical symbols "∩" and "∪" in a plurality of places, where "∩" may represent "and". For example, "A∩B" may represent that both A and B are met. "∪" may represent "or". For example, "A∪B" may represent that either A or B is met.

Seventh, in embodiments of this application, a plurality of formulas is used as examples, for example, a formula used to calculate a cut-off frequency, a formula used to calculate a window length of a filter, and a formula used to calculate a filter weight. It should be understood that these formulas are merely examples for ease of understanding, and should not constitute any limitation on this application. A person skilled in the art may perform mathematical transformation or equivalent replacement on the formula in this document based on a same concept, to achieve a same or similar effect. These mathematical transformations or equivalent replacements shall fall within the protection scope of this application.

Eighth, in embodiments of this application, the first control moment and the second control moment are listed. The first control moment is a current control moment. The second control moment is a previous control moment of the first control moment, or in other words, a previous control moment.

Ninth, the battery information in embodiments of this application is mainly battery information of the ESS. The ESS and the battery are alternately used below, and meanings expressed by the ESS and the battery are the same.

The following describes in detail the power control method according to embodiments of this application with reference to the accompanying drawings.

It should be understood that the power control method according to embodiments of this application may be applied to an energy system. The energy system may include a power control apparatus, an ESS, and a renewable energy system. The power control method according to this embodiment of this application may be performed by a power control apparatus. The power control apparatus may be, for example, the PCS or the DC-DC converter listed above. For ease of understanding and description, the following first briefly describes the power control apparatus with reference to FIG. 3, and then describes in detail a power control method according to an embodiment of this application with reference to FIG. 4.

Figure 3:
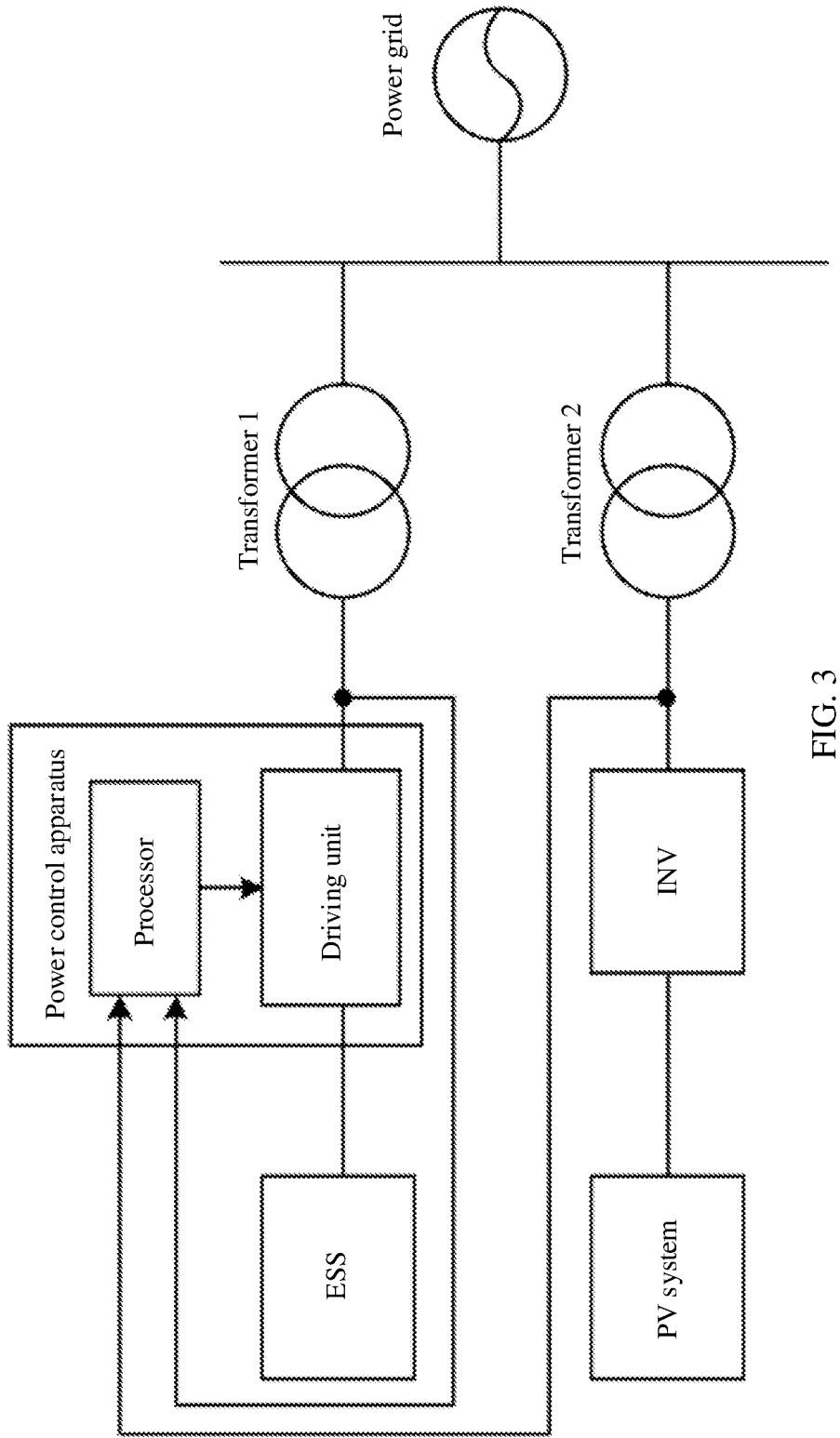
FIG. 3 is a schematic diagram of applying, in an alternating current coupling architecture, an energy system according to an embodiment of this application.

FIG. 3 is a schematic diagram of applying a power control apparatus according to an embodiment of this application to the system architecture shown in FIG. 2. As shown in FIG. 3, the power control apparatus may include a processor and a driving unit. The processor may be connected to the ESS and the PV system, so as to perform sampling from the ESS and the PV system to obtain a total power output by the ESS and the PV system at each control moment. For ease of differentiation and description, in this document, the total power sampled from the ESS and PV system is denoted as a/the sampling power. For each control moment, the sampling power may include the active power of the ESS and an output power of the PV system. The active power of the ESS may be an input active power when the ESS is charged or an output active power when the ESS is discharged.

It should be understood that a case in which the power control apparatus is applied to the alternating current coupling scheme based on the PV system is merely shown as an example herein, and the case shall not constitute any limitation on this application. For example, the power control apparatus may also be used in the system architecture of the direct current coupling scheme based on the PV system shown in FIG. 1. This is not limited in this application.

At each control moment, the processor may be configured to collect the battery information of the ESS, and adjust a filter parameter based on the battery information. The FIR filter may perform filtering on the sampling power based on filter parameters obtained through adjustment, to obtain the power obtained through filtering. It should be understood that a function of the FIR filter may be implemented by using a computer software. For example, a processor may execute corresponding program code to implement the function of the FIR filter, or in other words, the processor may invoke corresponding program code to perform an operation of the FIR filter. Therefore, the FIR filter is not shown in FIG. 3. However, this should not constitute any limitation on this application. Certainly, the FIR filter may alternatively be implemented by using a large-scale integrated digital hardware. This is not limited in embodiments of this application.

After one or more times of adjustment to filter parameters and one or more times of power filtering, the power fluctuation may be suppressed. For example, the power fluctuation rate may be less than or equal to a preset threshold. Thereafter, the processor may determine a given power of the ESS based on the power obtained through filtering, and output the determined given power of the ESS to the driving unit. The driving unit may control the active power of the ESS based on the received given power of the ESS.

It should be understood that, the controlling the active power of the ESS may be controlling the active power of the ESS that is at the current control moment (that is, the first control moment), or may be controlling an active power of the ESS that is at a next control moment, so that the active power sampled by the power control apparatus from the ESS that is at the next control moment is close to the given power. This is not limited in embodiments of this application.

Figure 4:
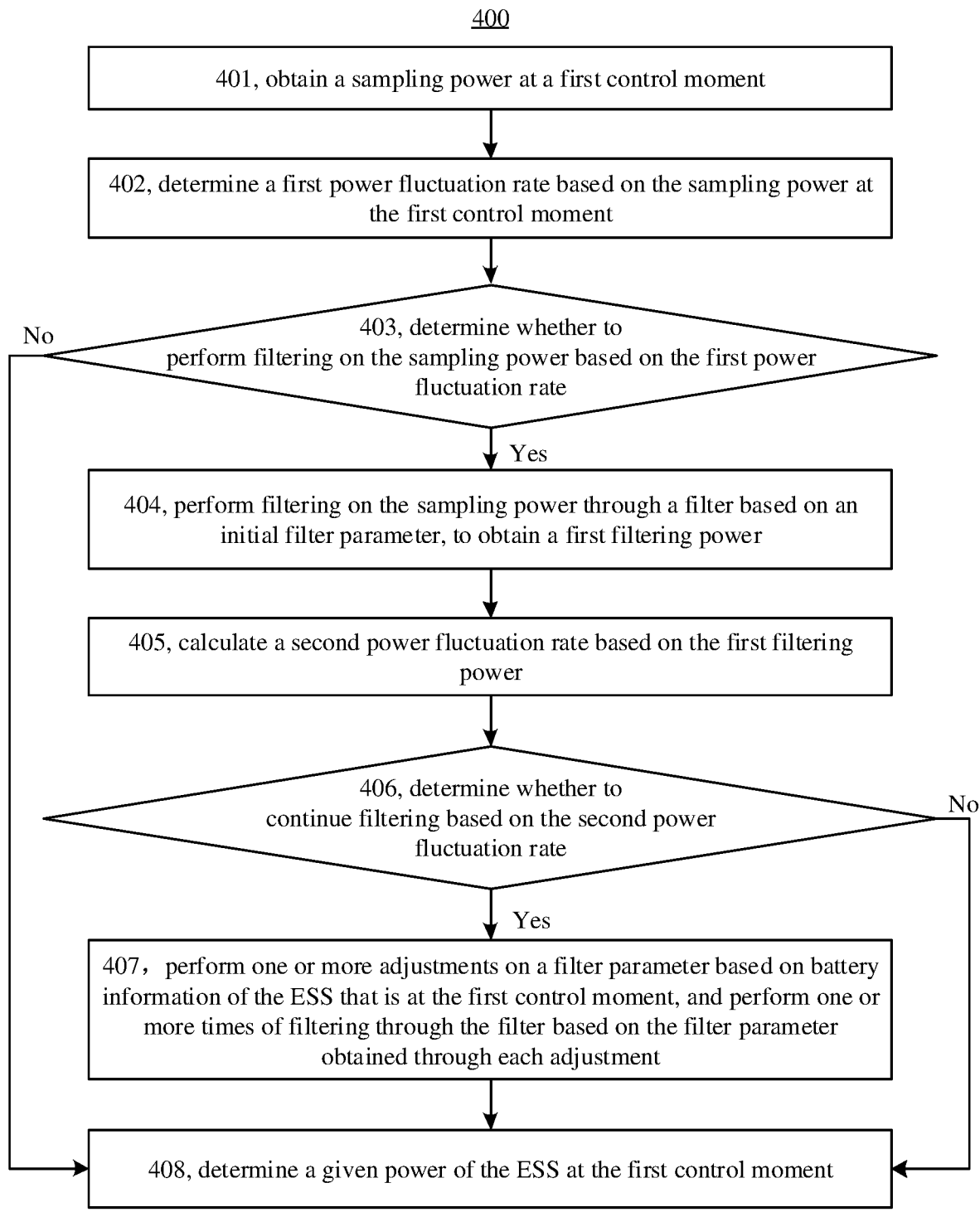
FIG. 4 is a schematic flowchart of a power control method according to an embodiment of this application.

FIG. 4 is a schematic flowchart of a power control method 400 according to an embodiment of this application. The method shown in FIG. 4 may be executed by a power control apparatus shown in FIG. 3.

The method 400 shown in FIG. 4 may include step 401 to step 408. The steps in FIG. 4 are described below in detail.

In step 401, a sampling power at a first control moment is obtained.

For example, the processor in the power control apparatus may be connected to the PV system and the ESS. The processor may sample the output power of the PV system and the active power of the ESS based on a preset sampling frequency.

It is assumed that an output power of the PV system at the first control moment is denoted as $P_{PV1}$, and the active power of the ESS that is at the first control moment is denoted as $P_{ESS1}$. In this case, the sampling power $P_1 = P_{PV1} + P_{ESS1}$ at the first control moment. It should be noted that the active power of the ESS may be a negative value when the ESS is in a charging state and a positive value when the ESS is in a discharging state.

It should be understood that the obtaining the sampling power herein is merely obtaining a value sum of the output power of the PV system and the active power of the ESS, rather than a power in a physical sense.

In step 402, a power fluctuation rate is calculated based on the sampling power at the first control moment.

It should be understood that a process of calculating the power fluctuation rate may be, for example, the two calculation methods shown in the foregoing term explanation, or another calculation method of the power fluctuation rate. This is not limited in this application.

For ease of differentiation and description, the power fluctuation rate obtained through calculation based on the sampling power at the first control moment may be denoted herein as a first power fluctuation rate $\delta_1$.

It should be understood that, a calculation method of the first power fluctuation rate may be referred to the foregoing detailed description of the power fluctuation rate. For brevity, details are not described herein again.

In step 403, it is determined whether to perform filtering on the sampling power based on the first power fluctuation rate.

For example, whether the sampling power needs to be filtered may be determined based on a relationship between a magnitude of the first power fluctuation rate and a magnitude of the preset threshold. When the first power fluctuation rate is greater than the preset threshold, if it is determined that the sampling power needs to be filtered, step 404 to step 406 may be performed; and when the first power fluctuation rate is less than or equal to the preset threshold, if it is determined that the sampling power does not need to be filtered, step 408 may be performed.

Optionally, the preset threshold is 1%.

It should be understood that, for a specific case, for example, a PV system state or an actual circuit requirement, the preset threshold may be another value. This is not limited in this application.

In step 404, the sampling power is filtered based on an initial filter parameter, to obtain the power obtained through filtering.

For example, when the first control moment is a first control moment, the initial filter parameter may be an initial value, for example, may be set manually; when the first control moment is not a first control moment, for example, is a specific control moment in a plurality of control moments, the initial filter parameter may be a filter parameter of a last control moment, for example, the previous control moment of the first control moment may be denoted as the second control moment.

It should be understood that, herein is merely a description of a possible case of the initial control parameter for ease of understanding, and it shall not constitute any limitation on this application.

For ease of differentiation and description, the power that is obtained after filtering and that is obtained by filtering the sampling power based on the initial filter parameter may be denoted herein as the first filtering power.

In step 405, a power fluctuation rate is calculated based on the first filtering power.

For ease of differentiation and description, the power fluctuation rate obtained through calculation based on the first filtering power may be denoted herein as a second power fluctuation rate $\delta_2$.

It should be understood that a method for calculating the second power fluctuation rate may be the same as or different from the method for calculating the first power fluctuation rate in step 402. This is not limited in embodiments of this application. It should be further understood that, a calculation method of the second power fluctuation rate may be referred to the foregoing detailed description of the power fluctuation rate. For brevity, details are not described herein again.

In step 406, it is determined whether to continue filtering based on the second power fluctuation rate.

For example, whether the sampling power needs to be filtered may be determined based on a relationship between a magnitude of the second power fluctuation rate and a magnitude of the preset threshold. When the second power fluctuation rate is greater than the preset threshold, if it is determined that the sampling power needs to be filtered, step 407 to step 408 may be performed; and when the second power fluctuation rate is less than or equal to the preset threshold, if it is determined that the sampling power does not need to be filtered, step 408 may be directly performed.

It should be understood that, when it is determined that filtering is required, the first filtering power may be used to replace the sampling power, or the sampling power is replaced with the first filtering power, and is input to the filter, so that the filter performs filtering on the first filtering power.

In step 407, one or more adjustments are performed on a filter parameter based on battery information of the ESS that is at the first control moment, and one or more times of power filtering are performed based on the filter parameter obtained through each adjustment.

At the first control moment, one or more adjustments may be performed on the filter parameter, and one or more times of power filtering may be performed based on the filter parameter obtained through each adjustment.

It should be understood that each of the one or more times of power filtering of the filter is filtering performed on a power obtained through a previous time of filtering. A result obtained through each filtering may be used to replace the power obtained before filtering to calculate the power fluctuation rate, so as to determine whether to continue filtering, based on the power fluctuation rate obtained through the latest calculation. For example, a power obtained through filtering is performed based on the first filtering power may be denoted as a second filtering power, and the second filtering power may be used to replace the first filtering power to calculate a power fluctuation rate, for example, denoted as a third power fluctuation rate. According to a relationship between a magnitude of the third power fluctuation rate and a magnitude of the preset threshold, whether to require to continue filtering may be further determined, and when filtering is required (that is, the third power fluctuation rate is greater than the preset threshold), filtering is performed on the second filtering power through the filter. Such iteration is not described herein again. Therefore, a closed-loop iteration process is formed.

In embodiments of this application, each adjustment of the filter parameters may include adjustment of one or more of the following: a cut-off frequency, a window length, and a filter weight.

The following describes the adjustment of each of the filter parameters in detail.

1. Adjustment of the Cut-Off Frequency:

The cut-off frequency may be adjusted based on a charge-discharge balance degree of the ESS that is at the first control moment. That is, the performing one or more adjustments on a filter parameter based on battery information of the ESS that is at the first control moment in step 407 may include: performing one or more adjustments on the cut-off frequency based on the charge-discharge balance degree of the ESS that is at the first control moment, to obtain the adjusted cut-off frequency.

For ease of understanding and description, a quantity of times of adjusting the cut-off frequency at the first control moment is denoted as T, where T≥1 and is an integer. For example, the $t^{th}$ adjustment of the cut-off frequency at the first control moment may satisfy:

$$\omega(t) = \begin{cases} \omega_0 + \|r(t)\| - (1 - D_B)\|\omega_B & |r(t)| > 1 - D_B \\ \omega_0 & \ldots \quad |r(t)| > D_B \cap |r(t)| \le 1 - D_B \\ \omega_0 - \|r(t)\| - D_B\|\omega_B & |r(t)| \le D_B \end{cases};$$

where 0≤t≤T−1, both t and T are integers; and r(t) represents a charge-discharge balance degree collected during the $t^{th}$ adjustment. $D_B$ is a predefined frequency value, and in embodiments of this application, $D_B$ may represent a dead zone, that is, a range in which a cut-off frequency of a filter needs to be adjusted when a charge-discharge balance degree is close to a fully charged state, a fully discharged state, or a balanced state. $\omega_B$ represents a maximum adjustment range of the cut-off frequency. $\omega_B \le \omega_0$. $\omega_0$ represents a rated cut-off frequency.

It may be seen that, when the charge-discharge balance degree r(t) of the ESS satisfies $|r(t)|>1-D_B$, the cut-off frequency $\omega(t)=\omega_0+\|r(t)|-(1-D_B)|\omega_B$, that is, the cut-off frequency is increased, and the filtering effect is weakened, so that the output active power (corresponding to a discharging situation) or the input active power (corresponding to a charging situation) of the ESS may be reduced. When the charge-discharge balance degree r(t) of the ESS satisfies $|r(t)|\le D_B$, the cut-off frequency $\omega(t)=\omega_0-\|r(t)|-D_B|\omega_B$, that is, the cut-off frequency is reduced, and the filtering effect is enhanced, so that the output active power or the input active power of the ESS may be increased. When the charge-discharge balance degree r(t) of the ESS satisfies $|r(t)|>D_B$ and $|r(t)|\le1-D_B$, the cut-off frequency $\omega(t)=\omega_0$, that is, the cut-off frequency remains unchanged, and the filtering effect remains unchanged. The output active power or the input active power of the ESS may remain the same as that at a last control moment.

Figure 5:
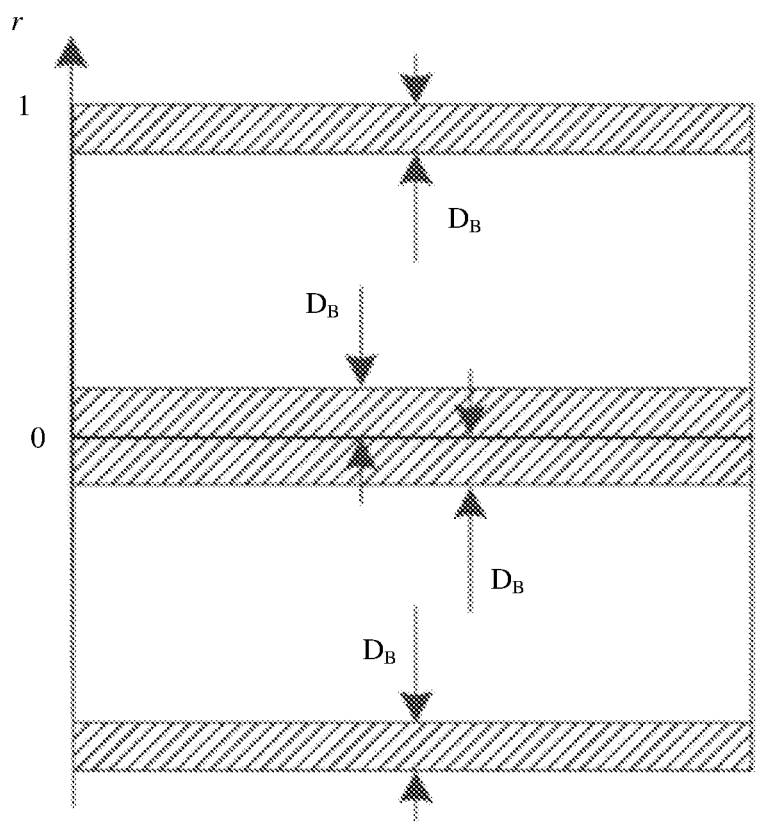
FIG. 5 is a schematic diagram of a relationship between a charge-discharge balance degree and a dead zone according to an embodiment of this application.

For ease of understanding, FIG. 5 is a schematic diagram of a relationship between a charge-discharge balance degree and a dead zone. As shown in FIG. 5, a vertical axis represents a charge-discharge balance degree. $D_B$ is a predefined frequency value, and in this embodiment of this application, $D_B$ is a dead zone, that is, is used to represent a range of a charge-discharge balance degree when the battery is close to a fully charged state, or close to a fully discharged state, or close to a balanced state. The range may be a predefined value. As shown in FIG. 5, if the charge-discharge balance degree is 1, it may represent that the battery is fully charged. In this case, a discharging capability is the strongest. A shadow area whose charge-discharge balance degree is $1-D_B$ to 1 may represent that the battery is going to be fully charged, that is, the battery is close to a fully charged state. If the charge-discharge balance degree is 0, it may represent that the battery is in a balanced state, and a charge-discharge capability is moderate. A shadow area whose charge-discharge balance degree is 0 to $D_B$ and $-D_B$ to 0 may represent that the battery is basically close to a balanced state. If the charge-discharge balance degree is −1, it may represent that the battery is already discharged. In this case, a charging capability is the strongest. A shadow area whose charge-discharge balance degree is −1 to $D_B-1$ may represent that the battery is going to be fully discharged, that is, the battery is close to a fully discharged state.

In different states, the cut-off frequency may be adjusted to adapt to different states of the battery. For example, when the battery is close to a fully charged state or close to a fully discharged state, that is, when $|r(t)|>1-D_B$, the cut-off frequency may be increased, and a filtering effect may be weakened, so that the input active power or the output active power of the ESS may be reduced. When the battery is close to a balanced state, that is, |r(t)|≤$D_B$, the cut-off frequency may be reduced, and the filtering effect may be enhanced, so that the output active power or the input active power of the ESS may be increased. When the battery is not in any one of the foregoing three states, that is, when |r(t)|>$D_B$ and |r(t)|≤1−$D_B$, the cut-off frequency may not be adjusted, that is, a filtering effect is not changed.

It can be known based on the foregoing formula for calculating the charge-discharge balance degree that the charge-discharge balance degree is calculated based on the collected SOC. In a control moment, a quantity of times of adjusting the cut-off frequency may be the same as or different from a quantity of times of collecting the SOC. This is not limited in this embodiment of this application. For example, the processor may collect the SOC of the ESS according to a preset collection frequency, so as to calculate the charge-discharge balance degree. When the quantity of times of adjusting the cut-off frequency is different from the quantity of times of collecting the SOC, the processor may calculate the charge-discharge balance degree based on a latest collected SOC of the ESS.

In addition, because the charge-discharge balance degree of the ESS at a control moment is generally stable, it may be considered that the charge-discharge balance degree of the ESS at the first control moment remains unchanged, that is, a quantity of times T of adjusting the cut-off frequency at the first control moment is 1.

2. Adjustment of the Window Length:

The window length may be adjusted based on the charge-discharge balance degree of the ESS that is at the first control moment and the power fluctuation rate obtained through a previous time of filtering. That is, the performing one or more adjustments on a filter parameter based on battery information of the ESS that is at the first control moment in step 407 may include: performing one or more adjustments on the window length based on the charge-discharge balance degree and the power fluctuation rate of the ESS that is at the first control moment, to obtain the adjusted window length.

For ease of understanding and description, a quantity of times of adjusting the window length at the first control moment is denoted as S, where S≥1 and is an integer.

For example, at the first control moment, the window length N(s) after an $s^{th}$ adjustment satisfies:

$$N(s) = [2(r_0 + 1)^2 - (r(s) + r_0)^2] \frac{N_0}{(r_0 + 1)^2} \frac{\delta_{s-1}}{\delta_{th}};$$

where $r_0$ represents a target value of the charge-discharge balance degree, and may be a predefined value; $N_0$ represents an initial value of a window length, $\delta_{th}$ represents a preset threshold, and $\delta_{s-1}$ represents a power fluctuation rate determined based on a power obtained through an $(s-1)^{th}$ filtering. 0≤s≤S−1, and both s and S are integers.

It should be understood that $N_0$ may be an initial value at which a smooth operation starts. When the PV system is shut down, the power control apparatus stops a current control mode and enters another control mode, or in another possible case, $N_0$ may also be adjusted or changed. This is not limited in this application. The adjustment of the window length in embodiments of this application mainly means adjustment of the window length in a power suppression process.

As described above, generally, the charge-discharge balance degree of the ESS is relatively stable at a control moment. Therefore, it may be considered that the charge-discharge balance degree of the ESS remains unchanged at the first control moment. In this case, r(s) is equivalent to the foregoing r(t), or may be replaced with, for example, may be replaced with r described below. The adjustment of the window length mainly depends on a power fluctuation rate determined based on a power obtained through each filtering.

Figure 6:
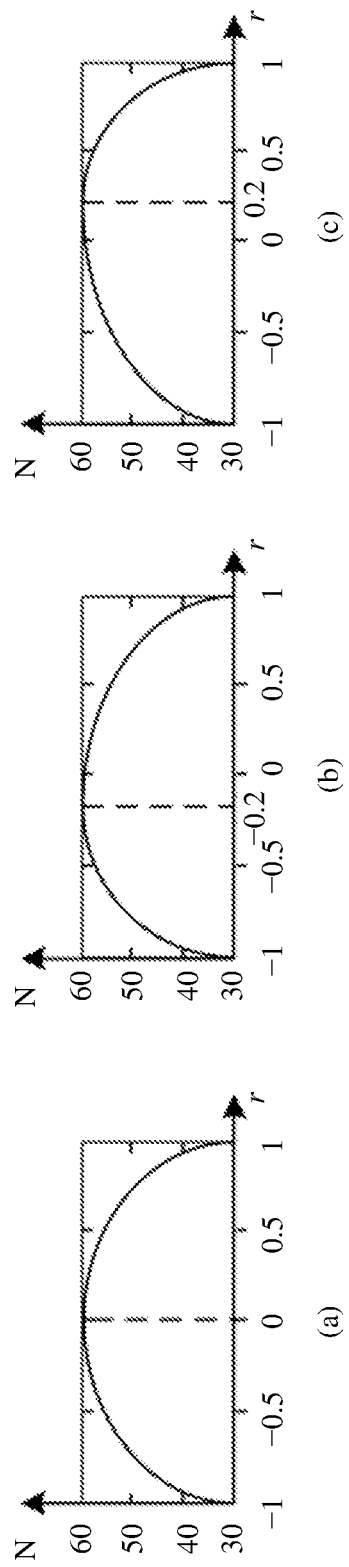
FIG. 6 is a schematic diagram of a change relationship between a window length and a charge-discharge balance degree under different target values of charge-discharge balance degrees according to an embodiment of this application.

FIG. 6 is a schematic diagram of a change relationship between a window length and a charge-discharge balance degree under different target values of the charge-discharge balance degree. (a) in FIG. 6 is a change relationship between a window length and a charge-discharge balance degree when a target value of the charge-discharge balance degree is 0, where a horizontal axis represents a charge-discharge balance degree, and a vertical axis represents a window length. (b) in FIG. 6 is a change relationship between a window length and a charge-discharge balance degree when a target value of the charge-discharge balance degree is −0.2. (c) in FIG. 6 is a change relationship between a window length and a charge-discharge balance degree when a target value of the charge-discharge balance degree is 0.2. It can be seen that, when the charge-discharge balance degree of the battery is at the target value of the charge-discharge balance degree, the window length of the filter is maximum, representing that the filtering effect is enhanced, thereby increasing the output active power of the ESS. When the battery power is close to fully charged or fully discharged, the window length of the filter is minimum, representing that the filtering effect is weakened, thereby reducing the output active power of the ESS.

It should be understood that FIG. 6 merely provides an example of a possible relationship between a window length and a charge-discharge balance degree. Generally, the window length reduces as an absolute value of the charge-discharge balance degree increases. This is not limited in this application.

3. Adjustment of the Filter Weight:

The filter weight may be used to apply a weight to each element in the filter sequence. Adjusting the filter weight is adjusting the weight of each element in the filtering sequence. The filtering sequence may be, for example, a sampling power at each control moment in a preset time period. For example, if the preset time period is 1 hour, and an interval of the control moments is 1 minute, the filtering sequence may be a sequence including 60 sampling powers, and the 60 sampling powers may correspond to 60 control moments in the preset time period.

In this embodiment of this application, the filter weight may adjust the filter sequence based on a charge or discharge direction of the ESS and a charge-discharge balance degree of the ESS.

For example, it is assumed that the first control moment is the $(N-1)^{th}$ control moment in the N control moments, a filter weight $\gamma_{N-1}$ of the first control moment may satisfy:

$$\gamma_{N-1} = \begin{cases} 1 - |r| & (r > 1 - D_B \cap P_{ESS}(N-1) \leq 0) \cup (r \leq D_B - 1 \cap P_{ESS}(N-1) > 0) \\ 1 & \ldots \quad |r| \leq 1 - D_B \\ 1 + |r| & (r > 1 - D_B \cap P_{ESS}(N-1) > 0) \cup (r \leq D_B - 1 \cap P_{ESS}(N-1) \leq 0) \end{cases};$$

where r may represent a charge-discharge balance degree of the ESS at the first control moment, and $P_{ESS}(N-1)$ represents an active power of the ESS at the first control moment. As described above, a charge-discharge balance degree of the ESS at a control moment is relatively stable, and r in the formula may be equivalent to the foregoing r(t) or r(s), or in other words, may be replaced with.

The filter weight $\gamma_{N-1}$ at the first control moment may also satisfy:

$$\gamma_{N-1} = \begin{cases} 1 - |r| & (r > 1 - D_B \cap P^*_{ESS}(N-2) \leq 0) \cup (r \leq D_B - 1 \cap P^*_{ESS}(N-2) > 0) \\ 1 & \ldots \quad |r| \leq 1 - D_B \\ 1 + |r| & (r > 1 - D_B \cap P^*_{ESS}(N-2) > 0) \cup (r \leq D_B - 1 \cap P^*_{ESS}(N-2) \leq 0) \end{cases};$$

where $P^*_{ESS}(N-2)$ represents a given power of the ESS at the last control moment (for example, the second control moment) of the first control moment; $P_{ESS}(N-1)>0$ or $P^*_{ESS}(N-2)>0$ may represent that the ESS is in a discharging state; and $P_{ESS}(N-1)<0$ or $P^*_{ESS}(N-2)<0$ may represent that the ESS is in a charging state.

It may be seen that, if the charge-discharge balance degree of the ESS at the first control moment satisfies $r>1-D_B$ and the ESS is in a charging state, or $r \leq D_B-1$ and the ESS is in a discharging state, the filter weight $\gamma$ may satisfy: $\gamma=1-|r|$. If the charge-discharge balance degree of the ESS at the first control moment satisfies $r>1-D_B$ and the ESS is in a discharging state, or $r \leq D_B-1$ and the ESS is in a charging state, the filter weight $\gamma$ satisfies: $\gamma=1+|r|$. If the charge-discharge balance degree of the ESS at the first control moment satisfies $|r| \leq 1-D_B$, the filter weight $\gamma$ may satisfy: $\gamma=1$. Optionally, the method further includes: determining an adjustment coefficient of the filter weight. The adjustment coefficient is used to adjust the filter weight, and may be specifically used to adjust a weight of each element in the filtering sequence. For adjusting the filter weight, on one hand, a weight of a recent power sequence may be considered to be increased, and a weight of a long-term power sequence may be reduced, so that the filtering result is more biased towards a real power direction; on the other hand, when the power suddenly changes, a weight of a sampling power at a control moment may be adjusted, so as to accelerate a filtering process, so that the power fluctuation rate is reduced to below the preset threshold as soon as possible, and the times of closed-loop iterations are reduced.

Specifically, the adjustment coefficient may satisfy: $\chi_n = \beta_n \alpha_n$, where $\chi_n$ represents an adjustment coefficient corresponding to an $n^{th}$ control moment in N control moments included in a window of the filter, and $\beta_n$ represents a first adjustment value corresponding to the $n^{th}$ control moment. It should be understood that the $n^{th}$ control moment may be, for example, the $n^{th}$ control moment in the foregoing N control moments. This is not limited in this application.

For example, a first adjustment value corresponding to the $n^{th}$ control moment may satisfy:

$$\beta_n = 1 - k + \frac{kn}{N},$$

where N represents a window length of the filter, $0 \leq n \leq N-1$, $N \geq 1$, both n and N are integers, and k is a coefficient of a window function weight of the filter.

It should be understood that the first adjustment value may be used to increase the weight of the recent power sequence and reduce the weight of the long-term power sequence, so that a filtering result is more biased towards the real power direction.

It should be noted that, as described above, the adjustment of the filter parameter may include the adjustment of the window length. Therefore, N herein may be an adjusted window length when the window length is adjusted, or may be an unadjusted window length when the window length is not adjusted.

Figure 7:
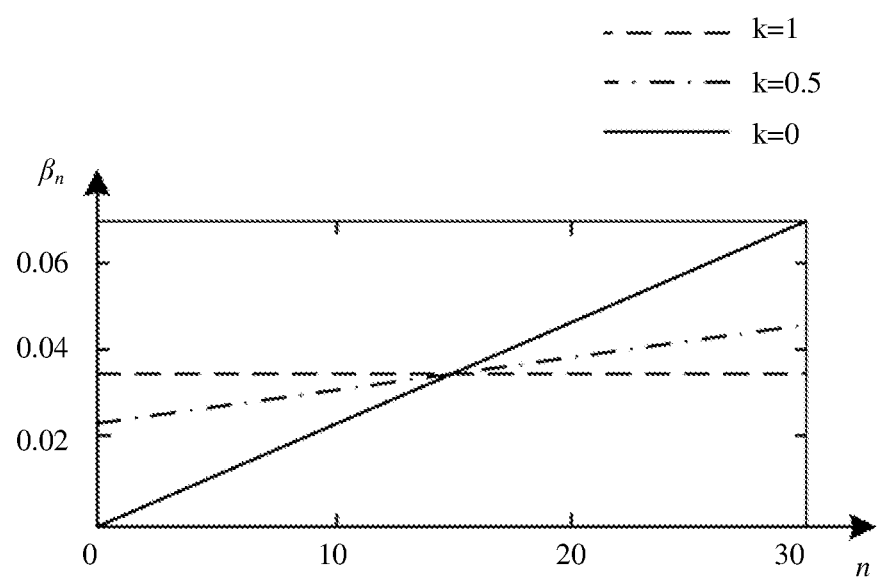
FIG. 7 is a schematic diagram of a relationship between a first adjustment value and a window length according to an embodiment of this application.

In addition, it should be further noted that a larger value of k indicates that the recent power is more considered. FIG. 7 is a schematic diagram of a relationship between a first adjustment value and a window length. In FIG. 7, a horizontal axis is a window length N, and a vertical axis is a first adjustment value $\beta_n$. FIG. 7 shows filter weight curves when k is respectively 0, 0.5, and 1. A dashed line represents a first adjustment value curve when k is 1, a dotted line represents a first adjustment value curve when k is 0.5, and a solid line represents a first adjustment value curve when k is 0. As shown in FIG. 7, when k is 0, it represents that the filter weight is not adjusted, and it represents that a shape of the window function may be a rectangular window. When k increases, the weight of the recent power also increases. For example, compared with the first adjustment value curve when k is 0.5, the first adjustment value curve when k is 1 has a larger weight of the recent power sequence and a smaller weight of the long-term power sequence. That is, the recent power is more considered when k=1 compared with when k=0.5.

It may be understood that, if a sudden change occurs in the sampling power at a control moment, which causes a great power fluctuation, if only filtering is required, a closed-loop iteration may be required for a plurality of times to obtain an ideal filtering result after the filtering effect is enhanced. Therefore, the weight of the power at the first control moment may be dynamically reduced, thereby enhancing a filtering effect. Therefore, the second adjustment value may be used to adjust the filter weight at the first control moment. Because the second adjustment value is applicable to adjusting a filter weight at a control moment at which the sampling power suddenly changes, when a power fluctuation rate is large, the control moment at which the sampling power suddenly changes is a last control moment in a preset node that uses the control moment as a node.

For example, it is assumed that a control moment at which a sudden change of the sampling power occurs is a first control moment, the first control moment is the $(N-1)^{th}$ control moment in the N control moments, and the second control moment is a previous control moment of the first control moment, that is, an $(N-2)^{th}$ control moment in the N control moments. When $P_{N-1}-P_{N-2}>\eta P_{N-1}$, the corresponding second adjustment value $\alpha_{N-1}$ may satisfy:

$$\alpha_{N-1} = \frac{P_{N-2}}{P_{N-1}};$$

and when $P_{N-1}-P_{N-2}<\eta P_{N-1}$, the corresponding second adjustment value $\alpha_{N-1}$ may satisfy:

$$\alpha_{N-1} = \frac{P_{N-1}}{P_{N-2}}. P_{N-1}$$

represents a sampling power that is at the $(N-1)^{th}$ control moment, and $P_{N-2}$ represents a sampling power at the $(N-2)^{th}$ control moment. It may be understood that $P_{N-2} \neq P_{N-1}$, that is, $\alpha_{N-1} \neq 1$.

In addition, whether the sampling power suddenly to change may also be measured by using a difference between sampling powers at two control moments. For example, when $P_{N-1} - P_{N-2} > \eta P_{N-1}$, it may be considered that the sampling power suddenly changes, and the second adjustment value $$\alpha_{N-1} = \frac{P_{N-2}}{P_{N-1}}$$

may be applied to the filter weight. When $P_{N-1} - P_{N-2} < \eta P_{N-1}$, it may be considered that the sampling power suddenly changes, and the second adjustment value $$\alpha_{N-1} = \frac{P_{N-1}}{P_{N-2}}$$

may be applied to the filter weight. When $|P_{N-1} - P_{N-2}| \leq \eta P_{N-1}$, it may be considered that the sampling power does not suddenly change, and the second adjustment value $\alpha_{N-1}$ may be applied to the filter weight. $\eta$ may be a predefined value, and $0 < \eta < 1$. For example, $\eta$ is 0.5. It should be understood that a specific value of $\eta$ is not limited in this embodiment of this application.

In another implementation, that the second adjustment value is not applied to the filter weight may also be understood as that a coefficient whose value is 1 is applied; or that the second adjustment value is applied to the filter weight may be understood as that a coefficient whose value is not 1 is applied.

For example, the second adjustment value may satisfy:

$$\alpha_n = \begin{cases} \frac{P_n}{P_{n-1}} & P_n - P_{n-1} < \eta P_n \\ 1 & \ldots \; |P_n - P_{n-1}| \leq \eta P_n ; \\ \frac{P_{n-1}}{P_n} & P_n - P_{n-1} > \eta P_n \end{cases}$$

it can be seen that, when $|P_n - P_{n-1}| \leq \eta P_n$, $\alpha_n = 1$; when $P_n - P_{n-1} < \eta P_n$, $$\alpha_n = \frac{P_n}{P_{n-1}};$$

and when $P_n - P_{n-1} > \eta P_n$, $$\alpha_n = \frac{P_{n-1}}{P_n}.$$

That is, when the sampling power suddenly changes, a coefficient whose value is not 1 is applied to the filter weight, and when the sampling power does not suddenly change, a coefficient whose value is 1 is applied to the filter weight.

It should be understood that, merely for ease of understanding, the foregoing shows, by using a formula, how to determine whether the sampling power suddenly changes, and shows a calculation formula of the second adjustment value. However, this should not constitute any limitation on this application. Whether the sampling power to suddenly change may also be determined by using another formula, and the second adjustment value may also be obtained by using another formula. This is not limited in embodiments of this application.

The given power $P^*_{ESS}(N-1)$ of the ESS that is at the $(N-1)^{th}$ control moment (that is, the first control moment: the $(N-1)^{th}$ control moment in the N control moments) determined under the adjustment of the foregoing filter weight satisfies:

$$P^*_{ESS}(N-1) = \frac{\sum_{n=0}^{N-1} \alpha_n \beta_n P_n}{\sum_{n=0}^{N-1} \alpha_n \beta_n} \gamma(n).$$

The power obtained through filtering is obtained by filtering, based on the filter parameter obtained through adjustment, the sampling power that is at the $(N-1)^{th}$ control moment, and $P_n$ represents the sampling power at the $n^{th}$ control moment.

It should be understood that, the performing adjustment on the filter parameter based on the weight herein may be performing adjustment based on any one of the filter weight, the filter weight adjusted through the first adjustment value, the filter weight adjusted through the second adjustment value, and the filter weight adjusted through the adjustment coefficient. Herein, the filter parameter is adjusted only as an example under an effect of the filter weight adjusted through the adjustment coefficient, and shall not constitute any limitation on this application.

As described above, the filtering performed by the filter on the power is a closed-loop iteration process. When the power fluctuation rate obtained by calculating based on the power after a specific time of filtering is less than or equal to the preset threshold, the filtering may be stopped. In this specification, it is assumed that the third power fluctuation rate calculated based on the second filtering power is less than or equal to the preset threshold. In this case, filtering at the first control moment ends.

It may be understood that the power filtering described above may be implemented through a filter, for example, an FIR filter. The filtering at the first control moment ends, which means that power filtering is not performed on the power obtained through filtering at the first control moment.

In step 408, a given power of the ESS that is at the first control moment is determined.

The given power of the ESS at the first control moment may be, for example, executed when the foregoing step 403 is determined as no, or executed when step 406 is determined as no, or executed after step 407. That is, the given power of the ESS at the first control moment may be determined based on the sampling power, when the power fluctuation rate (that is, the foregoing first power fluctuation rate) calculated based on the sampling power is less than or equal to the preset threshold. Alternatively, when the first power filter is greater than a preset threshold, the given power of the ESS that is at the first control moment may be determined based on the power obtained through filtering. Regardless of which power is used for determining, the power should satisfy: a power fluctuation rate calculated based on the power is less than or equal to a preset threshold.

It could be understood that, when filtering is not performed on the sampling power, the given power of the ESS that is at the first control moment may be the same as the given power of the ESS that is at the second control moment, and the given power of the ESS that is at the second control moment may be directly determined as the given power of the ESS that is at the first control moment.

The process of determining, based on the power obtained through filtering, the given power of the ESS that is at the first control moment is described in detail below. For ease of understanding and description, both the first filtering power and the second filtering power are denoted as filtering power. It should be understood that a power fluctuation rate calculated based on the filtering power should be less than or equal to the preset threshold. Step 408 may specifically include: determining, based on the power obtained through filtering, a given power of the ESS that is at the first control moment.

A possible implementation is: subtracting a sampling power at the first control moment from the filtering power to obtain a power change value; and then superposing the given power of the ESS at the second control moment and the power change value to obtain the given power of the ESS at the first control moment.

It should be noted that the foregoing implementation may also be applicable to a case in which no filtering is performed. For example, the sampling power is subtracted from the sampling power, an obtained power change value is zero, and then the power change value is superimposed with the given power of the ESS at the second control moment, so as to obtain that the given power of the ESS at the first control moment is still the given power of the ESS at the second control moment. That is to say, step 408 may be implemented by performing a same operation, and a difference lies in that the input power value varies according to whether power filtering is performed at the first control moment and the times of filtering.

Then, the given power of the ESS at the first control moment may be output to the driving unit. The driving unit may perform closed-loop adjustment based on the given power to obtain a modulation signal, and control, based on the modulation signal, a switching transistor of the power control apparatus to work, so as to generate a current corresponding to the given power, thereby suppressing a power of the PV system. It should be understood that, for control of the active power of the ESS by the driving unit, refer to the prior art. For brevity, details are not described herein again. It should be understood that this document is merely an example, and the second filtering power is used as an example to describe a process of determining the given power of the ESS at the first control moment. However, this should not constitute any limitation on this application. As described above, the power control apparatus may perform iteration on the power input to the filter, and perform a plurality of times of filtering, until a filtering fluctuation rate determined based on the power that is obtained after filtering and that is output after a specific time of filtering is less than or equal to the preset threshold.

It should be further understood that the given power of the ESS that is at the foregoing first control moment is used to control an active power of the ESS.

Specifically, the given power of the ESS that is at the first control moment determined based on step 408 may be input to the driving unit, and the driving unit controls the active power of the ESS to be close to the given power based on the given power.

Based on the foregoing method, the battery information is considered in a power smooth control process, and a relationship is established between the battery information and a filter characteristic. When a battery capability is insufficient, the filter parameter is adjusted with reference to the battery information, and a cut-off frequency, a window length, a filter weight, and the like are adjusted for different battery states, so as to prevent a battery from quickly reaching a fully charged state or a fully discharged state. This prolongs time of a smooth service, improves reliability of the smooth service, and protects customer interests.

Figure 8:
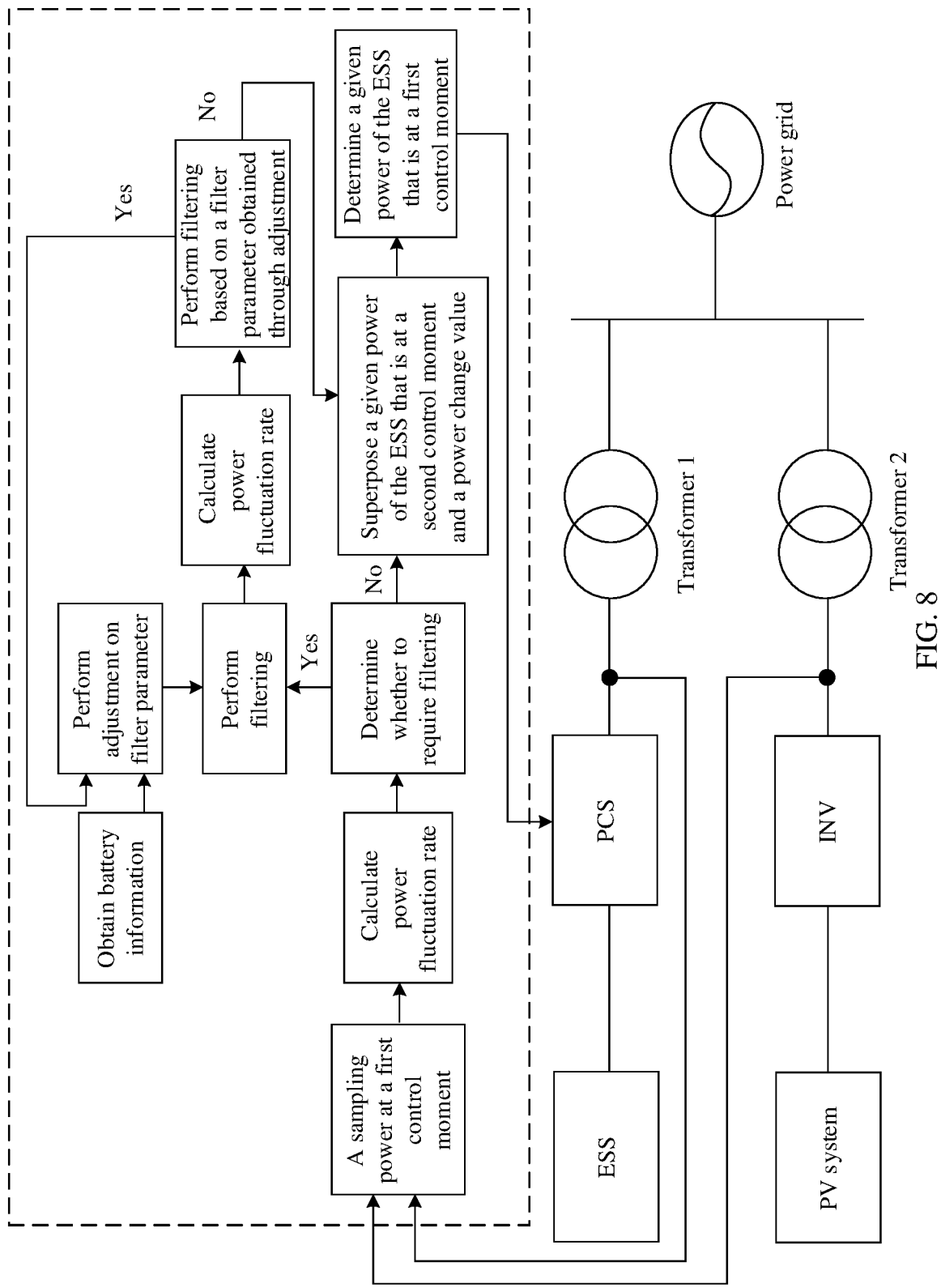
FIG. 8 is a schematic diagram of applying, in an alternating current coupling architecture, a power control method according to an embodiment of this application.
Figure 9:
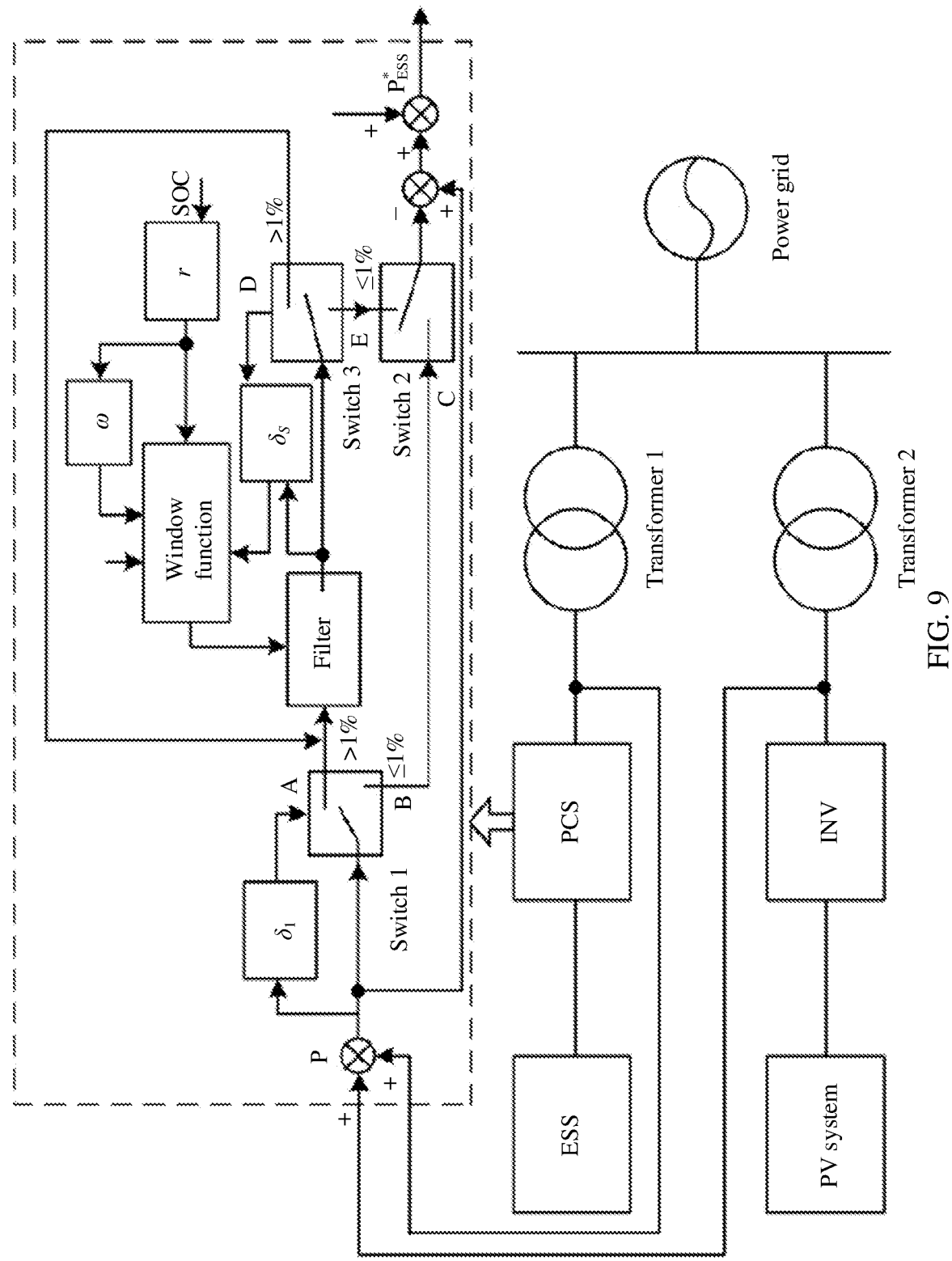
FIG. 9 is another schematic diagram of applying, in an alternating current coupling architecture, a power control method according to an embodiment of this application.

To better understand embodiments of this application, the following describes in detail a power control method according to embodiments of this application with reference to FIG. 8 and FIG. 9.

FIG. 8 is a schematic diagram of an example in which a power control method in an embodiment of this application is applied in an alternating current coupling architecture. FIG. 8 describes a power control method according to an embodiment of this application by using an example in which a PCS is used as a power control apparatus. Steps performed by the PCS and a logical relationship between the steps are shown in detail in a dashed box in FIG. 8.

As shown in FIG. 8, the PCS determines the sampling power at the first control moment based on the active power of the ESS and the output power of the PV system, calculates a power fluctuation rate based on the sampling power at the first control moment, and determines, based on the power fluctuation rate, whether filtering is required.

If filtering is not required, the power change value may be obtained by subtracting the sampling power at the first control moment from the sampling power, and then the power change value is superimposed with the given power of the ESS at the second control moment to obtain the given power of the ESS at the first control moment.

It should be understood that, when filtering is not required, the foregoing power change value is zero, and therefore the obtained given power of the ESS at the first control moment is the given power of the ESS at the second control moment.

If filtering is required, filtering may be performed on the sampling power through a filter, to obtain a power obtained through filtering, that is, the first filtering power described above. Thereafter, the first filtering power may be used to replace the sampling power, and the power fluctuation rate may be calculated again to determine whether filtering is required.

If filtering is not required, the given power of the ESS that is at the first control moment may be determined according to the foregoing method, and details are not described herein again.

If filtering is required, the battery information of the ESS may be obtained, the filter parameter is adjusted according to the obtained battery information, and then filtering is performed, based on the filter obtained through adjustment, on the power (that is, the foregoing first filtering power) input to the filter. As described above, one or more adjustments may be performed on the filter parameter, and the times of filtering performed based on the filter parameter obtained through each adjustment may also be one or more times. The power obtained through each filtering may be used to replace the power input to the filter last time, calculate a power fluctuation rate, and when filtering is required, perform filtering on the power obtained through a previous time of filtering through the filter, so as to perform iteration, until a filtering fluctuation rate determined based on a power that is obtained after filtering and that is output after a specific time of filtering is less than or equal to the preset threshold. In this way, power control within a control moment can be completed.

It should be understood that, for each step in FIG. 8, refer to related descriptions in the power control method 400. For brevity, details are not described herein again.

FIG. 9 is another schematic diagram of applying, in an alternating current coupling architecture, a power control method according to an embodiment of this application.

FIG. 9 shows parameters and related circuit implementations involved in each step in FIG. 8. For example, after the sampling power at the first control moment is determined, whether filtering is performed may be determined based on the first power fluctuation rate $\delta_1$. When $\delta_1 > 1\%$, it is determined that filtering is required, and a switch 1 is connected to A. When $\delta_1 \leq 1\%$, it is determined that filtering is not required, and the switch 1 is connected to B. Correspondingly, a switch 2 is connected to C. 1% is an example of the preset threshold. After filtering is performed, the power fluctuation rate $\delta_s$ is calculated based on the power obtained through each filtering, and $\delta_s$ may represent the power fluctuation rate calculated based on the power obtained through the $s^{th}$ filtering. Similar to the foregoing description, whether to continue filtering may be determined based on a relationship between $\delta_s$ and a magnitude of 1% of the preset threshold. When $\delta_s > 1\%$, it is determined that filtering is required, a switch 3 is connected to D, and the power obtained through filtering is input to the filter. When $\delta_s \leq 1\%$, it is determined that filtering is not required, the switch 3 is connected to E, and the switch 2 is also connected to E.

When the switch 3 is connected to D, an SOC of the ESS may be collected, and a charge-discharge balance degree r is calculated based on the SOC, so as to adjust a cut-off frequency ω based on r, and may adjust a window function based on the SOC, r, and $\delta_s$. It should be understood that the adjustment of the window function includes adjustment of one or more of a window length and a filter weight. The adjusted parameters are all input to the filter. In this way, the filter may filter the input power based on the adjusted parameters.

Because the closed-loop iteration process is described in detail above with reference to FIG. 4 and FIG. 8, for brevity, details are not described herein again.

It should be understood that in FIG. 9, for example, a preset threshold of the power fluctuation rate is 1%, whether filtering is required is determined. This should not constitute any limitation on this application.

Figure 10:
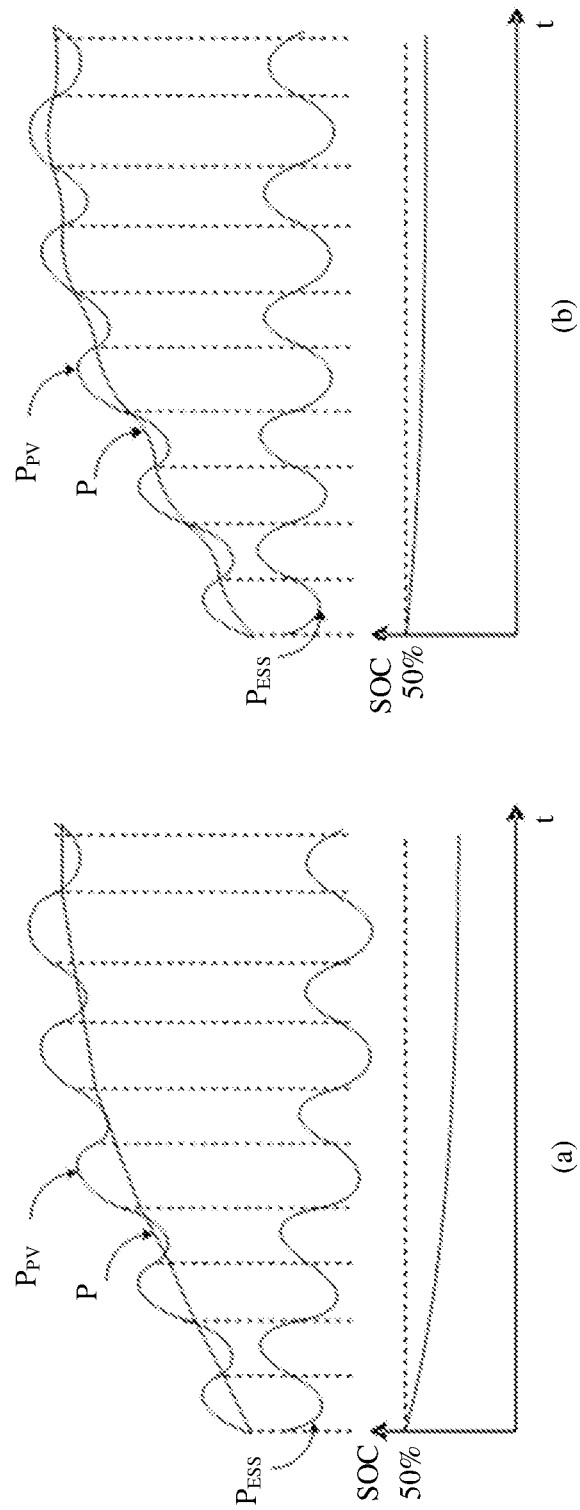
FIG. 10 is a schematic diagram of a power control effect according to an embodiment of this application.

FIG. 10 is a schematic diagram of a power control effect. (a) in FIG. 10 is a schematic diagram of a power control effect when a power control method according to this application is not used, and (b) in FIG. 10 is a schematic diagram of a power control effect when a power control method according to an embodiment of this application is used. It can be seen that under the same conditions, for example, the powers from the PV system are the same, a change of the active power of the ESS shown in (b) is smoother than that shown in (a), and a change of the SOC shown in (b) is also smoother than that shown in (a). In other words, by using the method according to this embodiment of this application, the filter parameter is adjusted with reference to the battery information of the ESS, and filtering is performed based on the adjusted parameter, so that a fluctuation of the SOC of the ESS after power control is relatively small. Therefore, this may effectively prevent a case in which the battery quickly reaches a fully charged state or a fully discharged state. This prolongs time of a smooth service, improves reliability of the smooth service, and protects customer interests.

It should be understood that, for ease of understanding and intuitive understanding the technical effects of the power control method according to this application herein, and the technical effects are provided as examples. However, this should not constitute any limitation on this application.

Figure 11:
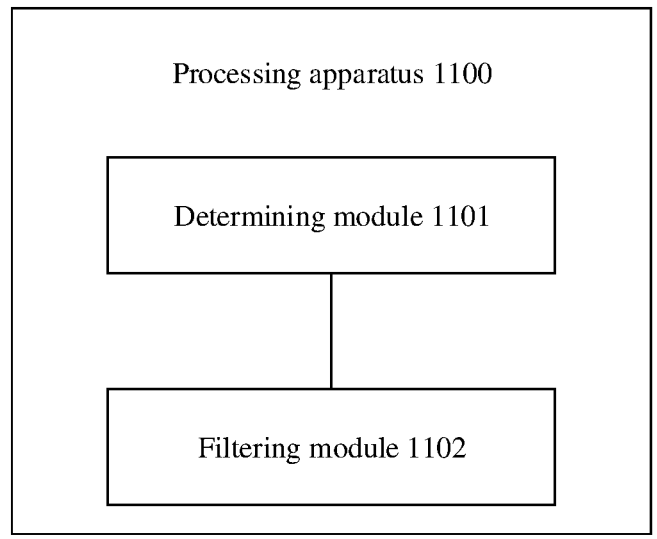
FIG. 11 is a schematic block diagram of a processing apparatus according to an embodiment of this application.

FIG. 11 is a schematic block diagram of a processing apparatus 1100 according to this application. As shown in FIG. 11, the processing apparatus 1100 may include a determining module 1101 and a filtering module 1102. For example, the processing apparatus may correspond to the processor in the foregoing power control apparatus, and is configured to implement functions and/or steps of the processor in the foregoing method embodiments.

The determining module 1101 may be configured to perform one or more adjustments on a filter parameter based on the battery information of the ESS that is at the first control moment, to obtain a filter parameter obtained through each adjustment. The filtering module 1102 may be configured to perform one or more times of power filtering by the filter based on the filter parameter obtained through each adjustment, until a power fluctuation rate determined by the determining module 1101 based on the power obtained through filtering is less than or equal to a preset threshold. The determining module 1101 is configured to determine, based on the power obtained through filtering, the given power of the ESS that is at the first control moment.

It should be understood that, each of the one or more times of power filtering is filtering performed based on a power obtained through a previous time of filtering, the sampling power at the first control moment includes an active power of the ESS and an output power of the renewable energy system that are sampled at the first control moment, and the given power of the ESS is used to control the active power of the ESS.

Optionally, the determining module 1101 may be further configured to determine that a power fluctuation rate calculated based on the sampling power that is at the first control moment is greater than the preset threshold.

Optionally, the power fluctuation rate indicates fluctuation amplitudes of powers sampled at a plurality of control moments in a window of the filter, an end position of the window is a latest control moment, and a length of the window is a quantity of control moments included in the window.

Optionally, the determining module 1101 may be further configured to: determine a power change value, where the power change value is a difference between the power obtained through filtering and the sampling power at the first control moment; and determine a given power of the ESS that is at the first control moment, where the given power of the ESS at the first control moment is a sum of a given power of the ESS at a second control moment and the power change value, and the second control moment is a previous control moment of the first control moment.

Optionally, the determining module 1101 may be further configured to perform T adjustments on the cut-off frequency based on the charge-discharge balance degree of the ESS that is at the first control moment, where a $t^{th}$ adjustment of the cut-off frequency satisfies: when the charge-discharge balance degree r(t) of the ESS satisfies $|r(t)|>1-D_B$, the cut-off frequency $\omega(t)=\omega_0+\|r(t)|-(1-D_B)|\omega_B$; or when the charge-discharge balance degree r(t) of the ESS satisfies $|r(t)|>D_B$ and $|r(t)|\leq 1-D_B$, the cut-off frequency $\omega(t)=\omega_0$; or when the charge-discharge balance degree r(t) of the ESS satisfies $|r(t)|\leq D_B$, the cut-off frequency $\omega(t)=\omega_0-\|r(t)|-D_B|\omega_B$, where $0\leq t\leq T-1$, $T\geq 1$, both t and T are integers, $D_B$ is a predefined frequency value, $\omega_B$ represents a maximum adjustment range of the cut-off frequency, and $\omega_0$ represents a rated cut-off frequency.

Optionally, the determining module 1101 may be further configured to perform S adjustments on the window length based on the charge-discharge balance degree of the ESS that is at the first control moment, where a window length N(s) after an $s^{th}$ adjustment satisfies:

$$N(s) = [2(r_0+1)^2 - (r(s)+r_0)^2]\frac{N_0}{(r_0+1)^2}\frac{\delta_{s-1}}{\delta_{th}},$$

where $0\leq s\leq S-1$, $S\geq 1$, and both s and S are integers; and $r_0$ represents the target value of the charge-discharge balance degree, $N_0$ represents a default value of the window length, $\delta_{th}$ represents the preset threshold, and $\delta_{s-1}$ represents a power fluctuation rate determined based on a power obtained through an $(s-1)^{th}$ time of filtering.

Optionally, the determining module 1101 may be further configured to adjust the filter weight based on the charge-discharge balance degree of the ESS that is at the first control moment, where when the charge-discharge balance degree of the ESS at the first control moment satisfies $r>1-D_B$ and the ESS is in a charging state, or $r\leq D_B-1$ and the ESS is in a discharging state, the filter weight $\gamma$ satisfies: $\gamma=1-|r|$; or when the charge-discharge balance degree of the ESS that is at the first control moment satisfies $r>1-D_B$ and the ESS is in a discharging state, or $r\leq D_B-1$ and the ESS is in a charging state, the filter weight $\gamma$ satisfies: $\gamma=1+|r|$; or when the charge-discharge balance degree of the ESS that is at the first control moment satisfies $|r|\leq 1-D_B$, the filter weight $\gamma$ satisfies: $\gamma=1$.

Optionally, the determining module 1101 may be further configured to determine an adjustment coefficient of the filter weight, where the adjustment coefficient satisfies: $\chi_n=\beta_n\alpha_n$, where $\chi_n$ represents an adjustment coefficient corresponding to the $n^{th}$ control moment in N control moments included in a window of the filter, $\beta_n$ represents a first adjustment value corresponding to the $n^{th}$ control moment, and $\beta_n$ satisfies:

$$\beta_n = 1 - k + \frac{kn}{N},$$

where N represents a window length of the filter, $0\leq n\leq N-1$, $N\geq 1$, both n and k are integers; k is a coefficient of a window function weight of the filter. $\alpha_n$ represents a second adjustment value corresponding to the $n^{th}$ control moment, and $\alpha_n$ satisfies: when $|P_n-P_{n-1}|\leq \eta P_n$, $\alpha_n=1$; or when $P_n-P_{n-1}>\eta P_n$, $$\alpha_n = \frac{P_{n-1}}{P_n};$$

or when $P_n-P_{n-1}<\eta P_n$, $$\alpha_n = \frac{P_n}{P_{n-1}},$$

when $\eta$ is a predefined value, and $0<\eta<1$; $P_n$ represents the sampling power at the $n^{th}$ control moment; and $P_{n-1}$ represents a sampling power at the $(n-1)^{th}$ control moment.

Optionally, if the first control moment is the $(N-1)^{th}$ control moment in the N control moments, a given power $P^*_{ESS}(N-1)$ of the ESS that is at the $(N-1)^{th}$ control moment determined based on the power obtained through filtering satisfies:

$$P^*_{ESS}(N-1) = \frac{\sum_{n=0}^{N-1}\alpha_n\beta_n P_n}{\sum_{n=0}^{N-1}\alpha_n\beta_n}\gamma(n),$$

where the power obtained through filtering is obtained by filtering, based on the filter parameter obtained through adjustment, the sampling power that is at the $(N-1)^{th}$ control moment, and $P_n$ represents the sampling power at the $n^{th}$ control moment.

Optionally, the battery information further includes a state of charge of the ESS, and the determining module 1101 may be further configured to determine the charge-discharge balance degree r:

$$r = \frac{SOC_c - \frac{SOC_{max} - SOC_{min}}{2}}{\frac{SOC_{max} - SOC_{min}}{2}}$$

of the ESS that is at the first control moment, based on the SOC of the ESS at the first control moment and the following formula, where $SOC_{max}$ represents a maximum value of the SOC of the ESS, $SOC_{min}$ represents a minimum value of the SOC of the ESS, and $SOC_c$ represents the state of charge of the ESS at the first control moment.

Optionally, the determining module 1101 may be further configured to: determine that a power fluctuation rate calculated based on the sampling power that is at the first control moment is less than or equal to the preset threshold; and determine, based on the sampling power at the first control moment, a given power of the ESS that is at the first control moment.

It should be understood that, in this embodiment of this application, module division is an example, and is merely a logical function division. During actual implementation, there may be another division manner. In addition, function modules in embodiments of this application may be integrated into one processor, or each of the modules may physically exist alone, or two or more modules are integrated into one module. The foregoing integrated modules may be implemented in a form of a hardware, or may be implemented in a form of a software functional module.

Figure 12:
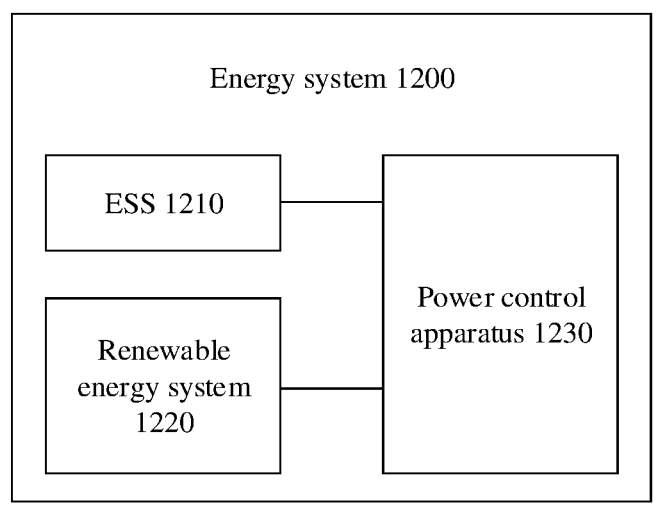
FIG. 12 is a schematic block diagram of an energy system according to an embodiment of this application.

FIG. 12 is a schematic block diagram of an energy system 1200 according to this application. As shown in FIG. 12, the energy system 1200 may include an ESS 1210, a renewable energy system 1220, and a power control apparatus 1230. The power control apparatus 1230 may be connected to the ESS 1210 and the renewable energy system 1220.

The power control apparatus 1230 may be configured to perform one or more adjustments on a filter parameter based on battery information of the ESS that is at the first control moment, and perform one or more times of power filtering by the filter based on the filter parameter obtained through each adjustment, until a power fluctuation rate determined based on a power obtained through filtering is less than or equal to a preset threshold, where each of the one or more times of power filtering is filtering performed based on a power obtained through a previous time of filtering, a sampling power at the first control moment includes an active power of the ESS and an output power of the renewable energy system that are sampled at the first control moment; determine, based on the power obtained through filtering, a given power of the ESS that is at the first control moment; and control the active power of the ESS based on the given power of the ESS that is at the first control moment.

The power control apparatus 1230 may be further configured to determine that the power fluctuation rate calculated based on the sampling power that is at the first control moment is greater than the preset threshold.

It should be understood that, the power fluctuation rate indicates fluctuation amplitudes of powers sampled at a plurality of control moments in a window of the filter, an end position of the window is a latest control moment, and a length of the window is a quantity of control moments included in the window.

The power control apparatus 1230 may be further configured to: determine a power change value, where the power change value is a difference between the power obtained through filtering and the sampling power at the first control moment; and determine a given power of the ESS that is at the first control moment, where the given power of the ESS at the first control moment is a sum of a given power of the ESS at a second control moment and the power change value, and the second control moment is a previous control moment of the first control moment.

It should be understood that, for adjustment of the filter parameter by the power control apparatus, refer to related descriptions in the foregoing method embodiments. For brevity, details are not described herein again.

It should be further understood that all or a part of the technical solutions according to embodiments of this application may be implemented by using a software, a hardware, a firmware, or any combination thereof. When software is used to implement the technical solutions according to embodiments of this application, all or a part of the technical solutions may be implemented in a form of a computer program product. The computer program product includes one or more computer instructions. When the computer program instructions are loaded and executed on the computer, procedures or functions according to embodiments of the present invention are all or partially generated. The computer may be a general-purpose computer, a dedicated computer, a computer network, a network device, a terminal device, or another programmable apparatus. The computer instructions may be stored in a computer readable storage medium, or may be transmitted from a computer readable storage medium to another computer readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device such as a server or a data center, including integrated one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, when there is no logical conflict, embodiments may be mutually referenced. For example, methods and/or terms between the method embodiments may be mutually referenced. For example, functions and/or terms between the apparatus embodiments may be mutually referenced. For example, functions and/or terms between the apparatus embodiments and the method embodiments may be mutually referenced.

It is clearly that, a person skilled in the art can make various modifications and variations to this application without departing from the scope of this application. This application is also intended to cover these modifications and variations of this application provided that they fall within the scope of protection defined by the following claims and their equivalent technologies.

What is claimed is:

1. A power control method, applied to an energy system comprising a power control apparatus, an energy storage system (ESS), and a renewable energy system, wherein the power control apparatus is connected to the ESS and the renewable energy system, and the method comprises:
    performing one or more adjustments on a filter parameter based on battery information of the ESS that is at a first control moment, and performing one or more times of power filtering by a filter based on a respective filter parameter obtained through each adjustment, until a power fluctuation rate determined based on a power obtained through filtering is less than or equal to a preset threshold, wherein a sampling power at the first control moment comprises an active power of the ESS and an output power of the renewable energy system that are sampled at the first control moment, and each of the one or more times of power filtering is filtering performed based on a power obtained through a previous time of filtering; and
    determining, based on the power obtained through filtering, a given power of the ESS that is at the first control moment, wherein the given power of the ESS is used to control the active power of the ESS.

2. The method according to claim 1, wherein before performing the one or more adjustments on the filter parameter based on the battery information of the ESS that is at the first control moment, the method further comprises:
    determining that a second power fluctuation rate calculated based on the sampling power that is at the first control moment is greater than the preset threshold.

3. The method according to claim 1, wherein:
    the power fluctuation rate indicates fluctuation amplitudes of powers sampled at a plurality of control moments in a window of the filter,
    an end position of the window is a latest control moment, and
    a length of the window is a quantity of control moments comprised in the window.

4. The method according to claim 1, wherein determining, based on the power obtained through filtering, the given power of the ESS that is at the first control moment comprises:
    determining a power change value, wherein the power change value is a difference between the power obtained through filtering and the sampling power at the first control moment; and determining the given power of the ESS that is at the first control moment, wherein the given power of the ESS at the first control moment is a sum of a given power of the ESS at a second control moment and the power change value, and the second control moment is a previous control moment of the first control moment.

5. The method according to claim 1, wherein the battery information of the ESS comprises a charge-discharge balance degree of the ESS, and the filter parameter comprises a cut-off frequency; and performing the one or more adjustments on the filter parameter based on the battery information of the ESS that is at the first control moment comprises:

performing T adjustments on the cut-off frequency based on the charge-discharge balance degree of the ESS that is at the first control moment, wherein a $t^{th}$ adjustment of the cut-off frequency satisfies:

when the charge-discharge balance degree r(t) of the ESS satisfies $|r(t)|>1-D_B$, the cut-off frequency $\omega(t) = \omega_0 + \|r(t)| - (1-D_B)|\omega_B$;

when the charge-discharge balance degree r(t) of the ESS satisfies $|r(t)|>D_B$ and $|r(t)|\leq 1-D_B$, the cut-off frequency $\omega(t) = \omega_0$; or when the charge-discharge balance degree r(t) of the ESS satisfies $|r(t)|\leq D_B$, the cut-off frequency $\omega(t) = \omega_0 - \|r(t)| - D_B|\omega_B$, wherein $0 \leq t \leq T-1$, $T \geq 1$, and both t and T are integers, $D_B$ is a predefined frequency value, $\omega_B$ represents a maximum adjustment range of the cut-off frequency, and $\omega_0$ represents a rated cut-off frequency.

6. The method according to claim 1, wherein the battery information of the ESS comprises a charge-discharge balance degree of the ESS, the filter parameter comprises a window length, and the window length is a quantity of control moments comprised in a window of the filter; and performing the one or more adjustments on the filter parameter based on the battery information of the ESS that is at the first control moment comprises:

performing S adjustments on the window length based on the charge-discharge balance degree of the ESS that is at the first control moment, wherein a window length N(s) obtained through an $s^{th}$ adjustment satisfies:

$$N(s) = [2(r_0+1)^2 - (r(s)+r_0)^2] \frac{N_0}{(r_0+1)^2} \frac{\delta_{s-1}}{\delta_{th}},$$

wherein $0 \leq s \leq S-1$, $S \geq 1$, and both s and S are integers; and $r_0$ represents a target value of the charge-discharge balance degree, $N_0$ represents a default value of the window length, $\delta_{th}$ represents the preset threshold, and $\delta_{s-1}$ represents a power fluctuation rate determined based on a power obtained through an power change values$-1)^{th}$ time of filtering.

7. The method according to claim 1, wherein the battery information of the ESS comprises a charge-discharge balance degree and a charge-discharge direction of the ESS, and the filter parameter comprises a filter weight; and performing the one or more adjustments on the filter parameter based on the battery information of the ESS that is at the first control moment comprises:

adjusting the filter weight based on the charge-discharge balance degree and the charge-discharge direction of the ESS that are at the first control moment, wherein:

when the charge-discharge balance degree of the ESS that is at the first control moment satisfies $r>1-D_B$ and the ESS is in a charging state, or when $r \leq D_B - 1$ and the ESS is in a discharging state, the filter weight $\gamma$ satisfies: $\gamma = 1 - |r|$;

when the charge-discharge balance degree of the ESS that is at the first control moment satisfies $r>1-D_B$ and the ESS is in a discharging state, or $r \leq D_B - 1$ and the ESS is in a charging state, the filter weight $\gamma$ satisfies: $\gamma = 1 + |r|$; or when the charge-discharge balance degree of the ESS that is at the first control moment satisfies $|r| \leq 1-D_B$, the filter weight $\gamma$ satisfies $\gamma = 1$.

8. The method according to claim 7, wherein the method further comprises:

determining an adjustment coefficient of the filter weight, wherein the adjustment coefficient satisfies $\chi_n = \beta_n \alpha_n$, wherein $\chi_n$ represents an adjustment coefficient corresponding to an $n^{th}$ control moment of N control moments comprised in a window of the filter;

$\beta_n$ represents a first adjustment value corresponding to the $n^{th}$ control moment, and $\beta_n$ satisfies $$\beta_n = 1 - k + \frac{kn}{N},$$

wherein N represents a window length of the filter, $0 \leq n \leq N-1$, $N \geq 1$, both n and N are integers, and k is a coefficient of a window function weight of the filter; and $\alpha_n$ represents a second adjustment value corresponding to the $n^{th}$ control moment, and $\alpha_n$ satisfies:

when $|P_n - P_{n-1}| \leq \eta P_n$, $\alpha_n = 1$; or when $P_n - P_{n-1} > \eta P_n$, $$\alpha_n = \frac{P_{n-1}}{P_n};$$

or when $P_n - P_{n-1} < \eta P_n$, $$\alpha_n = \frac{P_n}{P_{n-1}};$$

wherein $\eta$ is a predefined value, and $0 < \eta < 1$; $P_n$ represents a sampling power at the $n^{th}$ control moment; and $P_{n-1}$ represents a sampling power at an $(n-1)^{th}$ control moment.

9. The method according to claim 8, wherein when the first control moment is an $(N-1)^{th}$ control moment of the N control moments, a given power $P^*_{ESS}(N-1)$ of the ESS that is at the $(N-1)^{th}$ control moment determined based on a power obtained through filtering satisfies:

$$P^*_{ESS}(N-1) = \frac{\sum_{n=0}^{N-1} \alpha_n \beta_n P_n}{\sum_{n=0}^{N-1} \alpha_n \beta_n} \gamma(n),$$

wherein the power obtained through filtering is obtained by filtering, based on a respective filter parameter obtained through adjustment, a sampling power that is at the $(N-1)^{th}$ control moment; and $P_n$ represents the sampling power at the $n^{th}$ control moment.

10. The method according to claim 5, wherein the battery information further comprises a state of charge (SOC) of the ESS, and the method further comprises:
  determining the charge-discharge balance degree r of the ESS that is at the first control moment, based on the SOC of the ESS at the first control moment and the following formula:

$$r = \frac{SOC_c - \frac{SOC_{max} - SOC_{min}}{2}}{\frac{SOC_{max} - SOC_{min}}{2}},$$

wherein
  $SOC_{max}$ represents a maximum value of the SOC of the ESS, $SOC_{min}$ represents a minimum value of the SOC of the ESS, and $SOC_c$ represents the state of charge of the ESS at the first control moment.

11. The method according to claim 2, wherein the method further comprises:
  determining that the power fluctuation rate calculated based on the sampling power that is at the first control moment is less than or equal to the preset threshold; and
  determining, based on the sampling power at the first control moment, the given power of the ESS that is at the first control moment.

12. The method according to claim 1, wherein the filter is a finite impulse response filter.

13. An energy system, comprising:
  an energy storage system ESS;
  a renewable energy system;
  a power control apparatus connected to the ESS and the renewable energy system, and configured to:
    perform one or more adjustments on a filter parameter based on battery information of the ESS that is at a first control moment, and perform one or more times of power filtering by a filter based on a respective filter parameter obtained through each adjustment, until a power fluctuation rate determined based on a power obtained through filtering is less than or equal to a preset threshold, wherein each of the one or more times of power filtering is filtering performed based on a power obtained through a previous time of filtering, and a sampling power at the first control moment comprises an active power of the ESS and an output power of the renewable energy system that are sampled at the first control moment;
    determine, based on the power obtained through filtering, a given power of the ESS that is at the first control moment; and
    control the active power of the ESS based on the given power of the ESS that is at the first control moment.

14. The energy system according to claim 13, wherein the power control apparatus is further configured to determine that a second power fluctuation rate calculated based on the sampling power that is at the first control moment is greater than the preset threshold.

15. The energy system according to claim 14, wherein the power fluctuation rate indicates fluctuation amplitudes of powers sampled at a plurality of control moments in a window of the filter, an end position of the window is a latest control moment, and a length of the window is a quantity of control moments comprised in the window.

16. The energy system according to claim 13, wherein the power control apparatus is further configured to:
  determine a power change value, wherein the power change value is a difference between the power obtained through filtering and the sampling power at the first control moment; and
  determine the given power of the ESS that is at the first control moment, wherein the given power of the ESS at the first control moment is a sum of a given power of the ESS at a second control moment and the power change value, and the second control moment is a previous control moment of the first control moment.

17. The energy system according to claim 13, wherein the battery information of the ESS comprises a charge-discharge balance degree of the ESS, and the filter parameter comprises a cut-off frequency; and
  the power control apparatus is configured to perform the one or more adjustments on the filter parameter based on the battery information of the ESS that is at the first control moment by:
  performing T adjustments on the cut-off frequency based on the charge-discharge balance degree of the ESS that is at the first control moment, wherein
  a $t^{th}$ adjustment of the cut-off frequency satisfies:
  when the charge-discharge balance degree r(t) of the ESS satisfies $|r(t)|>1-D_B$, the cut-off frequency $\omega(t)=\omega_0+\|r(t)|-(1-D_B)|\omega_B$;
  when the charge-discharge balance degree r(t) of the ESS satisfies $|r(t)|>D_B$ and $|r(t)|\leq 1-D_B$, the cut-off frequency $\omega(t)=\omega_0$; or
  when the charge-discharge balance degree r(t) of the ESS satisfies $|r(t)|\leq D_B$, the cut-off frequency $\omega(t)=\omega_0-\|r(t)|-D_B|\omega_B$, wherein $0\leq t\leq T-1$, $T\geq 1$, and both t and T are integers; $D_B$ is a predefined frequency value; $\omega_B$ represents a maximum adjustment range of the cut-off frequency; and $\omega_0$ represents a rated cut-off frequency.

18. The energy system according to claim 13, wherein the battery information of the ESS comprises a charge-discharge balance degree of the ESS, the filter parameter comprises a window length, and the window length is a quantity of control moments comprised in a window of the filter; and
  the power control apparatus is configured to perform the one or more adjustments on the filter parameter based on the battery information of the ESS that is at the first control moment by:
  performing S adjustments on the window length based on the charge-discharge balance degree of the ESS that is at the first control moment, wherein
  a window length N(s) obtained through an $s^{th}$ adjustment satisfies:

$$N(s) = [2(r_0 + 1)^2 - (r(s) + r_0)^2] \frac{N_0}{(r_0 + 1)^2} \frac{\delta_{s-1}}{\delta_{th}},$$

wherein $0<s\leq S-1$, $S\geq 1$, and both s and S are integers; and $r_0$ represents a target value of the charge-discharge balance degree, $N_0$ represents a default value of the window length, $\delta_{th}$ represents the preset threshold, and $\delta_{s-1}$ represents a power fluctuation rate determined based on a power obtained through an power change values$-1)^{th}$ time of filtering.

19. The energy system according to claim 13, wherein the battery information of the ESS comprises a charge-discharge balance degree and a charge-discharge direction of the ESS, and the filter parameter comprises a filter weight; and the power control apparatus is configured to perform the one or more adjustments on the filter parameter based on the battery information of the ESS that is at the first control moment by:

adjusting the filter weight based on the charge-discharge balance degree and the charge-discharge direction of the ESS that are at the first control moment, wherein when the charge-discharge balance degree of the ESS that is at the first control moment satisfies $r > 1 - D_B$ and the ESS is in a charging state, or when $r \leq D_B - 1$ and the ESS is in a discharging state, the filter weight $\gamma$ satisfies: $\gamma = 1 - |r|$; or when the charge-discharge balance degree of the ESS that is at the first control moment satisfies $r > 1 - D_B$ and the ESS is in a discharging state, or $r \leq D_B - 1$ and the ESS is in a charging state, the filter weight $\gamma$ satisfies: $\gamma = 1 + |r|$; or when the charge-discharge balance degree of the ESS that is at the first control moment satisfies $|r| \leq 1 - D_B$, the filter weight $\gamma$ satisfies $\gamma = 1$.

20. The energy system according to claim 19, wherein the power control apparatus is further configured to:

determine an adjustment coefficient of the filter weight, wherein the adjustment coefficient satisfies $\chi_n = \beta_n \alpha_n$, wherein $\chi_n$ represents an adjustment coefficient corresponding to an $n^{th}$ control moment of N control moments comprised in a window of the filter;

$\beta_n$ represents a first adjustment value corresponding to the $n^{th}$ control moment, and $\beta_n$ satisfies $$\beta_n = 1 - k + \frac{kn}{N},$$

wherein N represents a window length of the filter, $0 \leq n \leq N-1$, $N \geq 1$, both n and N are integers, and k is a coefficient of a window function weight of the filter; and $\alpha_n$ represents a second adjustment value corresponding to the $n^{th}$ control moment, and $\alpha_n$ satisfies:

when $|P_n - P_{n-1}| \leq \eta P_n$, $\alpha_n = 1$;

when $P_n - P_{n-1} > \eta P_n$, $$\alpha_n = \frac{P_{n-1}}{P_n};$$

or when $P_n - P_{n-1} < \eta P_n$, $$\alpha_n = \frac{P_n}{P_{n-1}},$$

wherein $\eta$ is a predefined value, and $0 < \eta < 1$; $P_n$ represents a sampling power at the $n^{th}$ control moment; and $P_{n-1}$ represents a sampling power at an $(n-1)^{th}$ control moment.

* * * * *

UNITED STATES PATENT AND TRADEMARK OFFICE
CERTIFICATE OF CORRECTION

PATENT NO. : 12,230,966 B2  
APPLICATION NO. : 18/476577  
DATED : February 18, 2025  
INVENTOR(S) : Dong et al.

Page 1 of 1

It is certified that error appears in the above-identified patent and that said Letters Patent is hereby corrected as shown below:

In the Claims

In Column 38, in Claim 18, Line 59, delete "$0<s\leq S-1$," and insert -- $0\leq s\leq S-1$, --.

In Column 40, in Claim 20, Line 21, delete "$Pn-Pn\text{-}1|<\eta Pn$," and insert -- $Pn-Pn\text{-}1<\eta Pn$, --.

Signed and Sealed this  
Twenty-ninth Day of April, 2025

Coke Morgan Stewart  
*Acting Director of the United States Patent and Trademark Office*